United States Patent
Inomata et al.

(10) Patent No.: US 7,768,731 B2
(45) Date of Patent: Aug. 3, 2010

(54) MAGNETIC RECORDING MEDIUM, MAGNETIC STORAGE AND METHOD FOR REPRODUCING INFORMATION FROM MAGNETIC RECORDING MEDIUM

(75) Inventors: Akihiro Inomata, Kawasaki (JP); Antony Ajan, Kawasaki (JP); Jun Taguchi, Kawasaki (JP); Koji Matsumoto, Kawasaki (JP); Wataru Yamagishi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/359,641

(22) Filed: Jan. 26, 2009

(65) Prior Publication Data

US 2009/0135513 A1   May 28, 2009

Related U.S. Application Data

(62) Division of application No. 10/949,034, filed on Sep. 24, 2004, now Pat. No. 7,502,188.

(30) Foreign Application Priority Data

Jan. 5, 2004   (JP)   ............................. 2004-000632
Mar. 4, 2004   (JP)   ............................. 2004-061225

(51) Int. Cl.
   *G11B 5/02*   (2006.01)
(52) U.S. Cl. ....................................................... 360/59
(58) Field of Classification Search .................. 360/59, 360/55, 69, 135; 428/815, 832; 365/171; 369/112.27
   See application file for complete search history.

(56) References Cited

U.S. PATENT DOCUMENTS

| | | | |
|---|---|---|---|
| 5,361,248 | A | 11/1994 | Hatwar et al. |
| 5,389,455 | A | 2/1995 | Saito |
| 5,626,973 | A | 5/1997 | Takeda |
| 5,679,455 | A | 10/1997 | Nakaki et al. |
| 5,935,701 | A | 8/1999 | Nishimura |
| 6,117,544 | A | 9/2000 | Hirokane et al. |
| 6,280,813 | B1 | 8/2001 | Carey et al. |
| 6,455,174 | B1 | 9/2002 | Takao et al. |
| 6,500,530 | B1 | 12/2002 | Sawamura et al. |
| 6,602,612 | B2 | 8/2003 | Abarra et al. |
| 6,645,646 | B1 | 11/2003 | Umeda et al. |

(Continued)

FOREIGN PATENT DOCUMENTS

EP   0 479 474   4/1992

(Continued)

*Primary Examiner*—Fred Tzeng
(74) *Attorney, Agent, or Firm*—Greer, Burns & Crain, Ltd.

(57) ABSTRACT

A magnetic recording medium includes a first magnetic layer; and a second magnetic layer formed on the first magnetic layer. The first magnetic layer and the second magnetic layer make exchange coupling therebetween and also, have their magnetizing direction in anti-parallel to one another. A net residual area magnetization of the first magnetic layer and the second magnetic layer is expressed by the following formula: $|Mr1 \times t1 - Mr2 \times t2|$ where $Mr1$ and $Mr2$ denote respective residual magnetizations of the first magnetic layer and the second magnetic layer, and $t1$ and $t2$ denote respective film thicknesses of them; and the net area magnetization at a first temperature is larger than the net area magnetization at a second temperature lower than the first temperature.

19 Claims, 13 Drawing Sheets

U.S. PATENT DOCUMENTS

| | | |
|---|---|---|
| 6,670,057 B2 | 12/2003 | Inomata |
| 6,689,495 B1 | 2/2004 | Sato et al. |
| 6,753,101 B1 | 6/2004 | Abarra et al. |
| 6,830,824 B2 | 12/2004 | Kikitsu et al. |
| 6,834,026 B2 | 12/2004 | Fullerton et al. |
| 6,881,496 B2 | 4/2005 | Okamoto |
| 7,110,287 B2 * | 9/2006 | Huai et al. .................. 365/171 |
| 7,110,327 B2 | 9/2006 | Takao et al. |
| 7,190,539 B1 * | 3/2007 | Nibarger ...................... 360/59 |
| 7,232,620 B2 | 6/2007 | Inomata |
| 7,327,528 B2 | 2/2008 | Inomata |
| 7,357,996 B2 * | 4/2008 | Sato et al. ................... 428/832 |
| 2001/0007722 A1 | 7/2001 | Wakabayashi |
| 2002/0132140 A1 | 9/2002 | Igarashi et al. |
| 2003/0082410 A1 | 5/2003 | Sato et al. |
| 2003/0124390 A1 | 7/2003 | Abarra et al. |
| 2003/0156502 A1 | 8/2003 | Murakami |
| 2004/0001420 A1 * | 1/2004 | Challener ............... 369/112.27 |
| 2004/0166371 A1 | 8/2004 | Berger et al. |
| 2004/0185306 A1 | 9/2004 | Coffey et al. |
| 2005/0135010 A1 * | 6/2005 | Liu et al. .................... 360/135 |
| 2005/0163962 A1 | 7/2005 | Kawato et al. |
| 2005/0193405 A1 * | 9/2005 | Hattori et al. ................ 720/659 |
| 2006/0062132 A1 | 3/2006 | Van Kesteren |
| 2006/0143635 A1 * | 6/2006 | Liu et al. .................... 720/659 |
| 2008/0180827 A1 * | 7/2008 | Zhu et al. ...................... 360/59 |
| 2009/0052076 A1 * | 2/2009 | Shimazawa et al. ........... 360/59 |
| 2009/0059410 A1 * | 3/2009 | Knigge et al. ................. 360/59 |
| 2009/0226762 A1 * | 9/2009 | Hellwig et al. .............. 428/815 |

FOREIGN PATENT DOCUMENTS

| | | |
|---|---|---|
| EP | 0 537 952 | 4/1993 |
| EP | 0 965 987 | 12/1999 |
| EP | 1 143 434 | 10/2001 |
| JP | 2000-011475 | 1/2000 |
| JP | 2000-182232 | 6/2000 |
| JP | 2000-200411 | 7/2000 |
| JP | 2001-056924 | 2/2001 |
| JP | 2002-358616 | 12/2002 |
| JP | 2003-085702 | 3/2003 |
| JP | 2003-085728 | 3/2003 |
| JP | 2003-085738 | 3/2003 |
| JP | 2003-263714 | 9/2003 |
| JP | 2001-060313 | 3/2006 |

* cited by examiner

|  | | MAGNETIC DISK 1 | MAGNETIC DISK 2 |
|---|---|---|---|
| COERCIVE FORCE (AT 25 °C) | kA/m | 363.4 | 474 |
| NET Mr × t (AT 25 °C) | nTm | 3.78 | 4.66 |
| SATURATION MAGNETIC FLUX DENSITY (AT 25 °C) | T | 0.341 | 0.436 |
| COERCIVE FORCE (AT 0 K) | kA/m | 790 | 766.3 |
| MAGNETOCRYSTALLINE ANISOTROPY CONSTANT (AT 0-K) | J/m$^3$ | $3.2 \times 10^5$ | $3.8 \times 10^5$ |

MAGNETIC RECORDING MEDIUM, MAGNETIC STORAGE AND METHOD FOR REPRODUCING INFORMATION FROM MAGNETIC RECORDING MEDIUM

This application is a Division of application Ser. No. 10/949,034, filed Sep. 24, 2004.

BACKGROUND OF THE INVENTION

1. Field of the Invention

The present invention relates to a magnetic recording medium, a magnetic storage and a method for reproducing information from the magnetic recording medium, suitable for high density recording, and, in particular, to a magnetic recording medium, a magnetic storage and a method for reproducing information from the magnetic recording medium in which the magnetic recording medium is selectively heated, and recording/reproduction is performed.

2. Description of the Related Art

Recently, high density recording has been rapidly promoted at a rate of 100% per year. In an in-plane recording method which is a main trend, it is presumed that the limit of plane recording density is 100 Gb/in$^2$. The reason therefor is that, in a high density recording range, for the purpose of medium noise reduction, a size of a crystal grain which acts as a magnetization unit in a recording layer is reduced, and a zigzag in a magnetization transition zone which is a boundary between crystal grains is reduced. However, when the size of the crystal grain is reduced, a volume of the magnetization unit is reduced, and thereby residual magnetization is reduced due to thermal fluctuation. Thus thermal stability may deteriorate.

As a magnetic recording medium which satisfies both the medium noise reduction and the thermal stability, a magnetic recording medium (so-called synthetic ferrimagnetic medium) which has two magnetic layers which make exchange coupling therebetween antiferromagnetically has been proposed (for example, see Japanese Laid-open Patent Application No. 2001-056924). In this configuration, a substantial volume of a crystal grain corresponds to a sum of the two magnetic layers making exchange coupling, thereby thermal stability remarkably increases, and also, it becomes possible to further reduce the medium noise since it becomes possible to achieve microscopic crystal grains.

SUMMARY OF THE INVENTION

However, in order to further improve the recording density, it is necessary to further improve the S/N ratio and the thermal stability even in the above-mentioned synthetic ferrimagnetic medium.

For example, as a method for improving the thermal stability, magnetocrystalline anisotropy is increased in a magnetic layer. However, when the magnetocrystalline anisotropy is increased, a coercive force increases, a head magnetic field in a head required for carrying out recording increases, and thus, overwrite performance is deteriorated. Conventionally, such a problem is solved by searching for a magnetic material which has a high saturation magnetic flux density Bs applied for a recording head. However, it is very difficult to develop a material having a further higher Bs.

On the other hand, in a field of a magneto-optical recording, a so-called thermal assist recording method has been employed in which a magneto-optical recording medium is selectively heated, a temperature thereof increases, and recording is performed on a part having the thus-reduced coercive force. In this method, a material having large magnetocrystalline anisotropy can be employed, thus thermal stability is improved, and also, recording is made possible with a relatively low head magnetic field. However, in this method, there are limits in increasing a laser power and in reducing a spot size required for increasing the recording density. Furthermore, there is a limit in reduction of the coercive force even thanks to temperature rise for achieving a high transfer rate. Accordingly, even in this method, it is difficult to achieve further increasing in the recording density even by means of improvement of thermal stability only thanks to the increase in magnetocrystalline anisotropy.

The present invention has been devised in consideration of the above-mentioned problem, and an object of the present invention is to provide a magnetic recording medium, a magnetic storage and a method for reproducing information from the magnetic recording medium by which both the high S/N ratio and the improved thermal stability of written bits are achieved, and the recording density is further increased.

According to a first aspect of the present invention, a magnetic recording medium is provided in which a first magnetic layer and a second magnetic layer formed on the first magnetic layer are provided, the first magnetic layer and the second magnetic layer make exchange coupling with one another, and also, in a condition in which no external magnetic field is applied, magnetization in the first magnetic layer and magnetization in the second magnetic layer are antiparallel to one another. Further, a net residual area magnetization of the first magnetic layer and the second magnetic layer is expressed by $|Mr1 \times t1 - Mr2 \times t2|$ where Mr1 and Mr2 denote respective ones of the residual magnetization of the first magnetic layer and the second magnetic layer, and t1 and t2 denote respective film thicknesses. Furthermore, the net residual area magnetization at a first temperature is larger than the net area magnetization at a second temperature lower than the first temperature.

In this configuration, since the net residual area magnetization $|Mr1 \times t1 - Mr2 \times t2|$ of the first magnetic layer and the second magnetic layer at the first temperature higher than the second temperature is larger than the net area magnetization at the second temperature, reproduction output increases, and S/N ratio can thus be increased. Further, the net area magnetization at the second temperature can be reduced, and as a result, a demagnetizing field from an adjacent bit is reduced in a case of an in-plane magnetic recording medium. Also, a demagnetizing field can be reduced, in a case of a vertical magnetic recording medium, and thus the thermal stability for written bits can be improved.

The first temperature is set higher than the second temperature, and should be appropriately selected at which the net residual area magnetization $|Mr1 \times t1 - Mr2 \times t2|$ increases thanks to materials of the first magnetic layer and/or the second magnetic layer, compositions thereof, or such. Also, the first temperature is set at which the residual magnetization in both the first magnetic layer and the second magnetic layer does not vanish. It is preferable that the first temperature is selected from a temperature range lower than 400° C. in terms of heat durability of a substrate, it is preferable that the first temperature is lower than 200° C. in terms of crystallization in a case of employing an amorphous layer as a foundation layer, and, it is further preferable that the first temperature is selected from a range lower than 150° C. Also, it is preferable that the first temperature is higher than 65° C. in terms of thermal stability of the first magnetic layer and/or the second magnetic layer.

Further, the second temperature is a temperature at which the magnetic recording medium is normally used, in other words, a room temperature, and, for example, is preferably selected from a range between 0° C. and 65° C. However, the second temperature is not limited to this range, and, for example, the second temperature may be a cooled temperature in a case where the magnetic recording medium is used at a temperature cooled to be lower than the room temperature, or is used in an environment cooled to be lower than the room temperature.

Furthermore, the more a ratio $|Mr1 \times t1 - Mr2 \times t2|/Hc$ between the net residual area magnetization $|Mr1 \times t1 - Mr2 \times t2|$ and a coercive force Hc can be reduced, the more a magnetization transition width can be reduced. In a conventional magnetic recording medium, the more the net residual area magnetization is reduced, the more the reproduction output decreases and the S/N ratio decreases. However, according to the present invention, since it is possible to increase the new residual area magnetization by increasing the temperature, such a problem does not occur, and it is possible to improve resolution and also improve the S/N ratio.

In a case where the first magnetic layer is located at a position on the side of a substrate, a relationship of the residual area magnetization between the first magnetic layer and the second magnetic layer may be such that $Mr2 \times t2 > Mr1 \times t1$. Thereby, it is possible to accurately record information to the second magnetic layer, nearer to a magnetic head, corresponding to a recording magnetic field inverting position of the magnetic head, and thus, NLTS is improved in a case of applying the in-plane magnetic recording medium. In a case of applying the vertical magnetic recording medium, since a recording magnetic field is applied to the second magnetic layer than to the first magnetic layer in a more concentrated manner, it is possible to shorten a magnetization transition zone in the second magnetic field, whereby a line recording density can be improved.

According to another aspect of the present invention, a magnetic storage is provided in which a magnetic recording medium having a recording layer containing crystalline magnetic grains, a heating unit selectively heating the magnetic recording medium, and a recording unit having a magnetic recording head. In this configuration, the heating unit heats the magnetic recording medium, and also, information is recorded to the magnetic recording medium with the use of the magnetic recording head.

In this configuration, the recording layer containing crystalline magnetic grains of the magnetic recording medium is selectively heated, coercive force (in detail, dynamic coercive force expressed by the expression (1) described later) in the recording layer is lowered. Thereby, even when the coercive force is higher than the conventional magnetic recording medium in a state of not being heated, it is possible to lower the coercive force as a result of heating the recording layer as mentioned above, in to the magnetic recording medium according to the present invention. Thereby, it is not necessary to increase a recording magnetic field from the magnetic head even for enabling easy recording, while keeping recording performance such as superior overwrite performance or such, and thus, it is possible to achieve the high S/N ratio. Furthermore, since it is possible to increase the coercive force or the magnetocrystalline anisotropy constant while keeping the superior recording performance, it is possible to improve the thermal stability. As a result, it is possible to achieve the magnetic storage having the high S/N ratio and the superior thermal stability.

Further, a magnetic storage may be provided according to the present invention in which a first magnetic layer and a second magnetic layer formed on the first magnetic layer are provided. The above-mentioned first magnetic layer and the second magnetic layer make exchange coupling with one another, and also, in a state in which no external magnetic field is applied, magnetization in the first magnetic layer and magnetization in the second magnetic layer are anti-parallel to one another. Further, a heating unit heats the above-mentioned magnetic recording medium selectively, and a recording/reproduction unit having a magnetic recording head and a magnetic reproduction head are provided in the magnetic storage. In this configuration, the heating unit heats the magnetic recording medium, and also, information is recorded on the magnetic recording medium with the use of the recording/reproduction unit.

In this configuration, the magnetic recording medium having recording layers including the first magnetic layer and the second magnetic layer making exchange coupling with one another antiferromagnetically is selectively heated, a coercive force (in detail, dynamic coercive force expressed by the expression (1) described later) in the recording layers is lowered. Thereby, even when the coercive force is higher than that in the conventional magnetic recording medium in a state of not heating in the magnetic recording medium according to the present invention, it is possible to lower the coercive force as a result of heating the recording layers as mentioned above. Thereby, it is not necessary to increase a recording magnetic field from the magnetic head even for enabling easy recording while keeping recording performance such as superior overwrite performance or such, and thus, it is possible to achieve high S/N ratio. Furthermore, since it is possible to increase the coercive force or magnetocrystalline anisotropy constant while keeping superior recording performance, it is possible to improve thermal stability. As a result, it is possible to achieve a magnetic storage having a high S/N ratio and superior thermal stability.

Further, in the magnetic storage according to the present invention, it is possible to keep overwrite performance and resolution even when a recording current supplied to the magnetic recording head is reduced in comparison to a case of applying a conventional magnetic recording medium. By thus reducing the recording current, it is possible to achieve a well-controlled distribution of a recording magnetic field from the magnetic recording head, and thus, it is possible to concentrate the recording magnetic field at a desired track of the magnetic recording medium. Therefore, it is possible to remarkably reduce side erase, avoid increase in the magnetization transition zone otherwise occurring due to the recording magnetic field widely spreading in a plane direction of the magnetic recording medium from the magnetic recording head when the recording current is on the order of 40 mA conventionally.

The temperature at which the magnetic recording medium is heated should be such as that at which the coercive forces in the first magnetic layer and the second magnetic layer may decrease from a condition of not heated, and may be the above-mentioned first temperature. This temperature may be such as that at which the amount of exchange coupling between the first magnetic layer and the second magnetic layer, for example, an exchange magnetic field may decrease. By thus weakening the exchange magnetic field between the first magnetic layer and the second magnetic layer, it becomes easier to switch a recording magnetic field direction so as to switch a magnetization direction in the first magnetic layer and/or the second magnetic layer, and it is possible to improve the overwrite performance, resolution and also NLTS (non-linear transition shift) performance.

Further, since a track width to record is determined by a width of a recording magnetic field applied by the magnetic recording head, specifically, a core width of the magnetic recording head, it is possible to widen a zone to heat than the track width according to the present invention in comparison to a case of a conventional magneto-optical recording method, and it is possible to achieve an increased track density more easily.

According to another aspect of the present invention, a magnetic storage is provided which includes a magnetic recording medium having a first magnetic layer and a second magnetic layer formed on the first magnetic layer, the first magnetic layer and the second magnetic layer make exchange coupling therebetween, and also, magnetization in the first magnetic layer and magnetization in the second magnetic layer are anti-parallel to one another in a state in which no external magnetic field is applied. Further, a heating unit heating the magnetic recording medium selectively and a recording/reproduction unit are provided in the magnetic storage. In the magnetic storage, the heating unit heats the magnetic recording medium so as to increase reproduction output, and information recorded in the magnetic recording medium is reproduced by means of the recording/reproduction unit.

According to the present invention, a portion at which desired information is recorded in the magnetic recording medium having recording layers including the first magnetic layer and the second magnetic layer making antiferromagnetically exchange coupling therebetween is selectively heated, and thus, reproduction output being increased, whereby the S/N ratio can be improved. For a portion of not heated or in a case where heating is not performed, a state in which the reproduction output is low is created, for example, net area magnetization in the first magnetic layer and the second magnetic layer can be reduced there or in such a case. As a result, in a case where an in-plane magnetic recording medium is applied, it is possible to reduce a demagnetizing field from an adjacent bit, while, in a case of a vertical magnetic recording medium, a demagnetizing field can be reduced and thus thermal stability in written bits can be improved.

FIGS. 1A and 1B partially show an in-plane magnetic recording medium for illustrating a principle of the present invention.

As shown, recording layers of the in-plane magnetic recording medium 10 according to the present invention include a first magnetic layer 11, a second magnetic layer 12 and a non-magnetic coupling layer 13 formed between the first and second magnetic layers 11 and 12. The first and second magnetic layers 11 and 12 are controlled by a film thickness of the non-magnetic coupling layer 13 or such so as to make exchange coupling antiferromagnetically. In this configuration, in a state in which no external magnetic field is applied, magnetization in the first magnetic layer 11 and magnetization in the second magnetic layer 12 are oriented in anti-parallel directions with one another. In this case, a magnetic leakage field from the first and second magnetic layers 11 and 12, i.e., the magnetic leakage field Hx used when a magnetic head reproduces information from the magnetic recording medium is in proportion to a net residual area magnetization $|Mr1 \times t1 - Mr2 \times t2|$ of the first and second magnetic layers 11 and 12 where Mr1 and Mr2 denote respective ones of residual magnetization in the first magnetic layer 11 and magnetization in the second magnetic layer 12, and t1 and t2 denote respective film thicknesses.

According to the present invention, magnetic layers having different temperature characteristics for the residual magnetization are used in combination as the first magnetic layer 11 and the second magnetic layer 12. A case where the temperature characteristics for the residual magnetization may be, in terms of physicality, a case where Curie temperatures in ferromagnetic materials or compensation temperatures in ferrimagnetic materials are different. In terms of materials, it may be a case where sizes of crystal grains are different. This case may be a case where the first magnetic layer 11 and the second magnetic layer 12 are made from many crystal grains or a case where they are made from amorphous materials. There, description will be made assuming that the Curie temperature of the first magnetic layer 11 is lower than the same of the second magnetic layer 12. In other words, as a result of being heated, a reduction rate in the residual magnetization is larger in the first magnetic layer 11 than in the second magnetic layer 12.

FIG. 1A shows a magnetization state in a case where the temperature in the magnetic recording medium is around a room temperature (i.e., one example of the second temperature claimed in claim 1), while FIG. 1B shows a magnetization state in which the temperature in the magnetic recording medium is higher than the room temperature, for example, 100° C. (one example of the first temperature claimed in claim 1). The residual area magnetization is such that $Mr2 \times t2 > Mr1 \times t1$ around the room temperature and also at 100° C. Since Mr1 at 100° C. decreases at a reduction rate higher than that of Mr2, the net residual area magnetization at 100° C. becomes larger than the net residual area magnetization around the room temperature. That is, in the case of FIG. 1A around the room temperature, the residual area magnetization in the first mutagenic layer 11 and the residual area magnetization in the second magnetic layer 12 are approximately same as one another. Accordingly, magnetic leakage fields from the first and second magnetic layers 11 and 12 cancel out by one another, so as to become smaller. In contrast thereto, in the case of FIG. 1B at 100° C., since the net residual area magnetization in the first magnetic layer 11 decreases, an amount of canceling out between the respective magnetic leakage fields from the first and second magnetic layers 11 and 12 decreases. As a result, a magnetic leakage field generated from the first and second magnetic layers 11 and 12 becomes larger than that in the case around the room temperature. Accordingly, the magnetic filed from the first and second magnetic layers 11 and 12 at 100° C., which the reproduction magnetic head can detect, increases, and as a result, reproduction output increases. Thus, in comparison to a conventional synthetic ferrimagnetic medium, reproduction output can be increased, and as a result, S/N ratio can be improved.

On the other hand, at the temperature around the room temperature, in the magnetic recording medium according to the present invention, as a result of setting the residual area magnetization in the first magnetic layer 11 and the residual area magnetization in the second magnetic layer 12 to be approximately same as one another in this condition, or to have a predetermined slight difference therebetween, since the magnetization in the first magnetic layer 11 and the magnetization in the second magnetic layer 12 are anti-parallel to one another, the net residual area magnetization in the first and second magnetic layers 11 and 12 are canceled out by one another. Accordingly, the magnetic leakage field generated from the first and second magnetic layers 11 and 12 are reduced. As a result, it is possible to reduce a demagnetizing field applied to an adjacent bit (magnetic domain) each other. More the demagnetizing fields are reduced, more the reduction in the residual magnetization due to aging can be reduced well, thermal stability in written bits is improved, and thus, it is possible to provide a magnetic recording medium having superior thermal stability.

The principle of the present invention is described next in more detail.

FIGS. 2A and 2B show temperature characteristics for the residual area magnetization in the magnetic recording medium according to the present invention.

With reference to FIG. 2A, in the magnetic recording medium according to the present invention, a relationship of residual area magnetization in the amounts and the Curie temperatures Tc1 and Tc2 between the first magnetic layer 11 and the second magnetic layer 12 becomes the same as that shown in FIGS. 1A and 1B. In other words, at a temperature T1, the residual area magnetization in the second magnetic layer 12 is larger than that in the first magnetic layer 11, and the first magnetic layer 11 and the second magnetic layer 12 have the net residual area magnetization A. Since the first magnetic layer 11 has the lower Curie temperature than that of the second magnetic layer 12 (Tc1<Tc2), when this magnetic recording medium is heated to the temperature T2 around the Curie temperature Tc1, the reduction rate in the residual area magnetization in the first magnetic layer 11 is so large that the net residual area magnetization B at this case increases remarkably from the net residual area magnetization A at the temperature T1. Accordingly, since reproduction output is in proportion to the net residual area magnetization B, it is possible to remarkably increase the reproduction output as a result of heating to the temperature T2.

With reference to FIG. 2B, according to a magnetic recording medium in another example of the present invention, a relationship in the Curie temperature between the first magnetic layer 11 and the second magnetic layer 12 is different from that shown in FIG. 2A. That is, the Curie temperature of the second magnetic layer 12 is lower than that of the first magnetic layer 11 (Tc1>Tc2). In other words, although this magnetic recording medium has a net residual area magnetization C which is approximately same as that of FIG. 2A at a temperature T1, the residual area magnetization of the second magnetic layer 12 decreases when it is heated, thereby it becomes approximately same as that of the first magnetic layer 11, and then, after it is further heated to a temperature T2, the residual area magnetization of the second magnetic layer 12 becomes smaller than that of the first magnetic layer 11. FIG. 2B also shows a magnetic leakage field of the first and second magnetic layers 11 and 12 in this case. As shown, the magnetic leakage field in proportion to the net residual area magnetization D has an orientation which is opposite to that at the temperature T1. Consequently, it can be seen that, also in this case, the same as in the case of FIG. 2A, it is possible to remarkably increase the reproduction output by heating the magnetic recording medium to the temperature T2.

Furthermore, not only for the in-plane magnetic recording medium as described above, the present invention can also be applied for a vertical magnetic recording medium, as is described next.

FIGS. 3A and 3B partially show a vertical magnetic recording medium for illustrating a principle of the present invention. As shown, the vertical magnetic recording medium 14 according to the present invention has recording layers including a first magnetic layer 15, a second magnetic layer 16, and a non-magnetic coupling layer 13 formed therebetween. The first and second magnetic layers 15 and 16 are controlled by a film thickness of the non-magnetic coupling layer 13 or such and make antiferromagnetically exchange coupling therebetween, and, in a state in which no external magnetic field is applied, magnetization in the first magnetic layer 15 and magnetization in the second magnetic layer 16 are oriented perpendicular to the film surface in anti-parallel to one another. In this case, a magnetic field leaking from the first and second magnetic layers 15 and 16, i.e., a magnetic field Hy which is used for reproducing information from the magnetic recording medium 14 by means of a magnetic head, is in proportion to the net residual area magnetization $|Mr1 \times t1 - Mr2 \times t2|$ of the first and second magnetic layers 15 and 16 where Mr1 and Mr2 denote respective ones of residual magnetization in the first magnetic layer 15 and residual magnetization in the second magnetic layer 16, and t1 and t2 denote respective film thicknesses. In a case where the Curie temperature of the first magnetic layer 15 is lower than that of the second magnetic layer 16, a reduction rate in the residual magnetization in the first magnetic layer 15 becomes larger than that in the second magnetic layer 16 when the magnetic recording medium 14 is heated. As a result, for example, at a temperature around the Curie temperature of the first magnetic layer 15, Mr1 decreases at the reduction rate larger than that of Mr2, and as a result, the net residual area magnetization increases to become larger than the same around the room temperature. Accordingly, reproduction output increases, and thus, S/N ratio is improved.

Thus, according to the present invention, by performing recording in a state in which coercive force is lowered as a result of a magnetic recording medium being heated at a time of recording, overwrite performance is improved, recording density is increased, and also, it is possible to provide both high S/N ratio and superior thermal stability. Furthermore, according to the present invention, a net area magnetization in a magnetic recording medium is reduced around a room temperature in comparison to a case of a conventional magnetic recording medium, while the same increases as the temperature is raised. Accordingly, reproduction output is increased and the S/N ratio is improved upon at a time or reproduction as a result of the magnetic recording medium being heated, while the thermal stability is improved since information recorded can be positively maintained at the room temperature.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

A first embodiment of the present invention is described now.

Figure 1A:
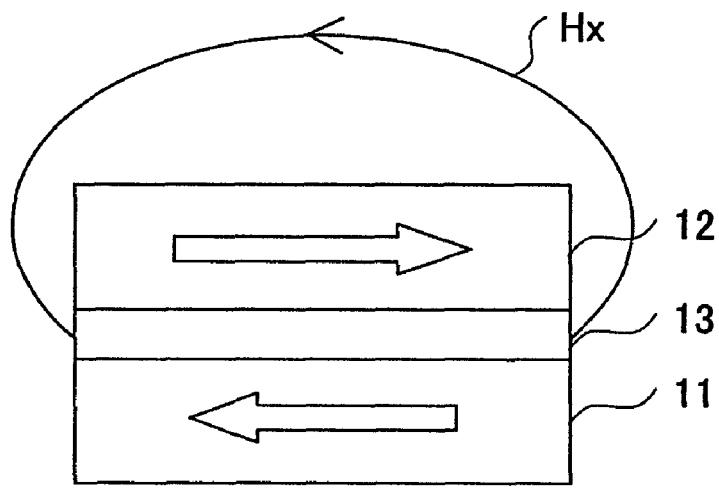
FIGS. 1A and 1B typically show a part of an in-plane magnetic recording medium for illustrating a principle of the present invention.
Figure 1B:
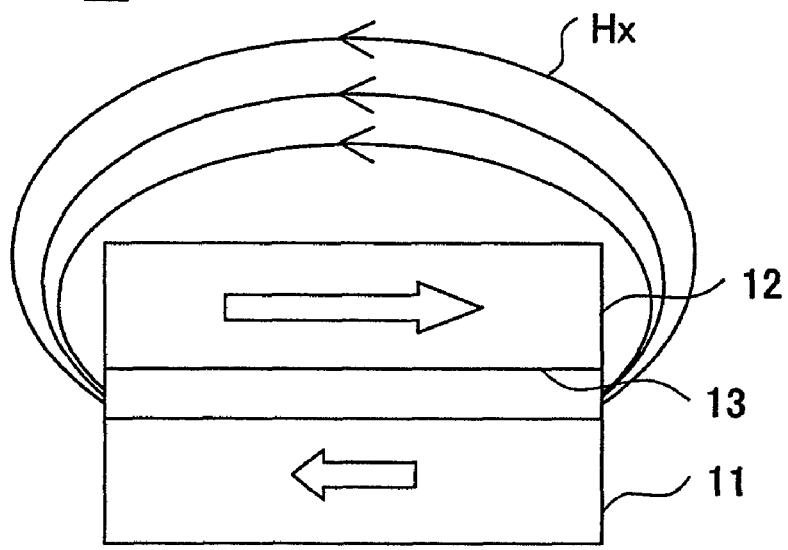
Figure 2A:
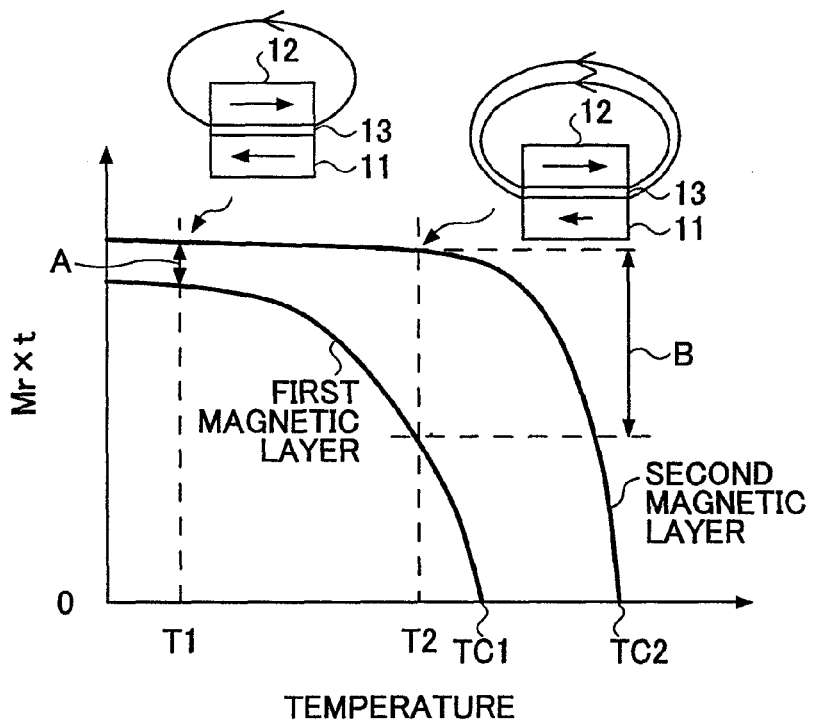
FIGS. 2A and 2B shows temperature characteristics of residual area magnetization in a magnetic recording medium according to the present invention.
Figure 2B:
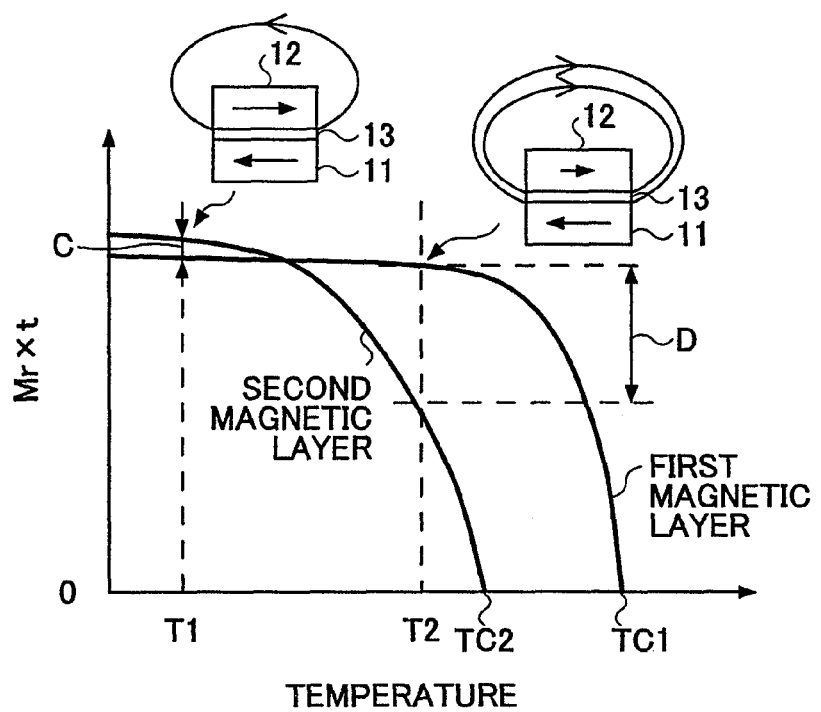
Figure 3A:
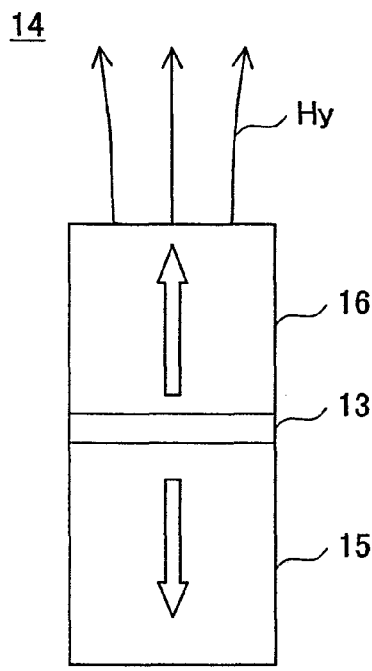
FIGS. 3A and 3B typically show a part of a vertical magnetic recording medium for illustrating a principle of the present invention.
Figure 3B:
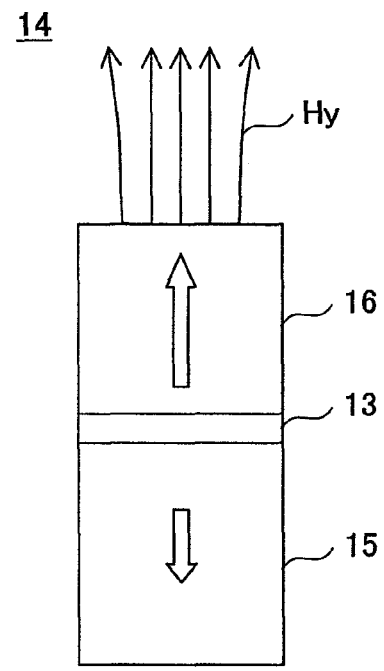
Figure 4:
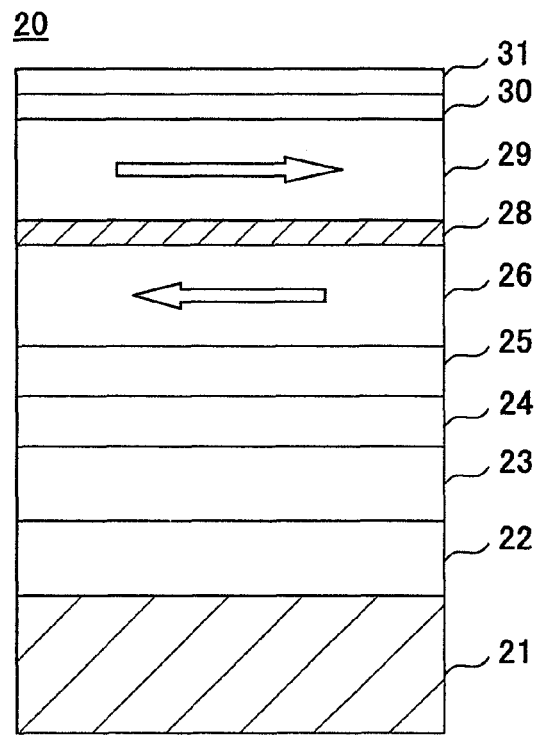
FIG. 4 shows an elevational sectional view of an in-plane magnetic recording medium according to a first embodiment of the present invention.

FIG. 4 shows an elevational sectional view of an in-plane magnetic recording medium according to a first embodiment of the present invention. As shown, the in-plane magnetic recording medium according to the first embodiment includes a substrate 21, and, thereon, a first seed layer 22, a second seed layer 23, a foundation layer 24, a non-magnetic intermediate layer 25, a first magnetic layer 26, a non-magnetic coupling layer 28, a second magnetic layer 29, a protective layer 30 and a lubrication layer 31 are formed in the stated order. The in-plane magnetic recording medium 20 has an exchange coupling structure in which the first magnetic layer 26 and the second magnetic layer 29 make antiferromagnetically exchange coupling therebetween via the non-magnetic coupling layer 28. There, magnetization oriented in an in-plane direction in the first magnetic layer 26 and the second magnetic layer 29 is oriented in anti-parallel between the first and second magnetic layers 26 and 29 in a condition in which no external magnetic field is applied. Further, as described above for the principle of the present invention, the first magnetic layer 26 and the second magnetic layer 29 have temperature characteristics different from one another for magnetization or residual magnetization (hereinafter, 'magnetization or residual magnetization' is simply referred to as 'residual magnetization' unless otherwise stated), and for example, have different Curie temperatures or compensation temperatures (hereinafter, unless otherwise stated, 'Curie temperatures or compensation temperature' are simply referred to as 'Curie temperatures'). Furthermore, there may be a case where, even when they have approximately the same Curie temperatures, they have different spin arrangements, that is, for example, one has ferrimagnetism and the other has ferromagnetism, or such.

As the substrate 21, for example, a disk-shaped plastic substrate, glass substrate, a NiP-plated aluminum alloy substrate, silicon substrate or such may be applied. In particular, in a case where the substrate 21 is a tape-shaped one, a plastic film such as PET, PEN, polyimide or such may be applied. The substrate 21 may have texture treatment performed thereon or not performed thereon. The texture treatment is performed in a circumferential direction, i.e., in a track longitudinal direction, in a case where the in-plane magnetic recording medium 20 is a magnetic disk.

The first seed layer 22 is made of non-magnetic material, for example, NiP, CoW, CrTi or such, and may have texture treatment performed thereon or not performed thereon. It is preferable that oxidization treatment is performed when the first seed layer 22 is made of amorphous material such as NiP or such. Thereby, in-plane orientation along c-axis is improved in the magnetic layer 26 and magnetic layer 29. Further, it is possible to employ a known material improving c-axis orientation instead of NiP.

The second seed layer 23 is made of, for example, amorphous material such as NiP, CoW, CrTi or such, or an alloy having a B2 structure such as AlRu, NiAl, FeAl or such. In a case where the second seed layer 23 is made of amorphous material and the foundation layer 24 formed thereabove is made of an alloy having a B2 structure, orientation in a (001) plane or a (112) plane is improved. Texture treatment may be performed or not. The texture treatment should be performed in a circumferential direction, i.e., a track longitudinal direction in a case where the in-plane magnetic recording medium 20 is a magnetic disk.

The foundation layer 24 is made of, for example, Cr, a Cr alloy such as CrMo, CrW, CrV, CrB, CrMoB or such, or an alloy having a B2 structure such as AlRu, NiAl, FeAl or such. As described above, the foundation layer 24 is formed by epitaxial growth on the second seed layer 23, and, when the foundation layer 24 has a B2 structure, a (001) plane or a (112) plane exhibits satisfactory orientation in the growth direction. In a case where the foundation layer 24 is made of Cr or a Cr alloy, a (002) plane exhibits satisfactory orientation in the growth direction. The foundation layer 24 may be made of a plurality of laminated layers made from a Cr alloy or an alloy having a B2 structure. By applying lamination of a plurality of layers, orientation in the foundation layer 24 itself is improved, epitaxial growth of the non-magnetic intermediate layer 25 is made satisfactory, and further, orientation in the first magnetic layer 26 and the second magnetic layer 29 can be improved.

The non-magnetic intermediate layer 25 is made from, for example, a non-magnetic alloy having an hcp structure in which an element or alloy M is added to a CoCr alloy, and, a film thickness is set in a range between 1 nm and 5 nm. The above-mentioned 'M' denotes one selected from among Pt, B, Mo, Nb, Ta, W, Cu and an alloy thereof. The non-magnetic intermediate layer 25 is formed by epitaxial growth succeeding crystallinity and crystal grain size to the foundation layer 24, improves the crystallinity of the first magnetic layer 26 and the second magnetic layer 29 which are then formed by epitaxial growth on the non-magnetic intermediate layer 25, reduces a distribution range of crystal grain (magnetic grain) sizes, and promotes c-axis orientation in the in-plane direction (in a direction parallel to the substrate plane). Further the non-magnetic intermediate layer 25 may be made of a plurality of laminated layers made from the above-mentioned alloy.

Thereby, orientation in the first magnetic layer 26 and the second magnetic layer 29 can be improved.

A grating constant of the non-magnetic intermediate layer 25 may be made different by several percent from that of the first magnetic layer 26 or the second magnetic layer 29, and inner stress may be made to occur in the in-plane direction in an interface between the non-magnetic intermediate layer 25 and the first magnetic layer 26 or inside the first magnetic layer 26. Thereby, it is possible to increase static coercive force in the first magnetic layer 26. Further, the non-magnetic intermediate layer 25 may be provided or may not be provided.

A film thickness of the first magnetic layer 26 may be set in a range between 0.5 nm and 20 nm, and is made of Co, Ni, Fe, a Co alloy, a Ni alloy, a Fe alloy or such. In particular, it is preferable to employ material such as Co, CoCr, CoCrTa, CoPt, CoCrPt or such, or, at least one of a group of rare-earth elements including Gd, Tb, Dy, Pr, Nd, Yb, Sm, Ho and Er is preferably added thereto. In such an alloy, polycrystal in which crystal grains are separated by grain boundaries is produced, spins which Co atoms and Gd atoms in crystal grains have, have a ferrimagnetic arrangement, and thus, become anti-parallel to one another. By controlling an amount of such a rare-earth to add, it is possible to control temperature characteristics of residual magnetization. Thereby, it is possible to increase a reduction rate of residual magnetization in the first magnetic layer 26 with respect to a temperature larger than that in the second magnetic layer 29 described later. It is possible to control the temperature characteristics of residual magnetization in the first magnetic layer 26 also by reducing the crystal grain diameter, reducing anisotropic magnetization, or such. Furthermore, it is possible to control the temperature characteristics of residual magnetization also by making composition of the first magnetic layer 26 slightly different from that of the second magnetic layer 29. Furthermore, the temperature characteristics of residual magnetization may be controlled also as a result of phase transition temperature inherent to the material such as Curie temperature being adjusted.

The first magnetic layer 26 is formed by epitaxial growth on the non-magnetic intermediate layer 25, the c-axis thereof is oriented in the in-plane direction, and the direction of easy axis of magnetization becomes the in-plane direction. It is preferable to add material selected from among B, Mo, Nb, Ta, W, Cu and an alloy thereof to the above-described material. Thereby, it is possible to control the crystal grain diameter. Furthermore, the first magnetic layer 26 may include a plurality of layers laminated. Thereby, orientation in the second magnetic layer 29 can be improved.

The non-magnetic coupling layer 28 is made of, for example, Ru, Rh, Ir, a Ru alloy, an Rh alloy, an Ir alloy or such. Thereamong, Rh and Ir have an fcc structure, while Ru has an hcp structure, and Ru has a grating constant such as a=0.27 nm which is approximate to that of a CoCrPt alloy having a grating constant of a=0.25 nm. Therefore, Ru or a Ru alloy is suitable to be employed. As the Ru alloy, an alloy of any one of Co, Cr, Fe, Ni and Mn, or an alloy thereof, with Ru, is preferable.

A film thickness of the non-magnetic coupling layer 28 is set in a range between 0.4 nm and 1.5 nm (preferably in a range between 0.6 nm and 0.9 nm, or, in a case of the Ru alloy, a range between 0.8 nm and 1.4 nm is preferable although it depends on the content of Ru therein). The first magnetic layer 26 and the second magnetic layer 29 make exchange coupling therebetween with the non-magnetic coupling layer 28 inserted therein. By setting the film thinness of the non-magnetic coupling layer 28 in the above-mentioned range, magnetization in the first magnetic layer 26 and magnetization in the second magnetic layer 29 couple antiferromagnetically with one another, and, as shown in FIG. 4, they become anti-parallel to one another in a condition in which no external magnetic field is applied. In particular, it is preferable to determine the film thickness of the non-magnetic coupling layer 28 to so as to correspond to the first antiferromagnetic peak (a peak on the side of the thinnest film thickness) of vibration-type exchange coupling depending on the thickness of the non-magnetic coupling layer.

A film thickens of the second magnetic layer 29 is set in a range between 5 nm and 20 nm, and is made from Co, Ni, Fe, a Co alloy, a Ni alloy, a Fe alloy or such. Especially, CoPt, CoCrTa or CoCrPt, or, material obtained from adding B, Mo, Nb, Ta, W, Cu or an alloy thereto is preferable. The second magnetic layer 29 is set to have temperature characteristics different from those of the first magnetic layer 26 as described above. Further, the same as in the first magnetic layer 26, material obtained from adding at least one element selected from among a rare-earth element group including Gd, Tb, Dy, Pr, Nd, Yb, Sm, Ho and Er may be used as the material of the second magnetic layer 29. Further, the second magnetic layer 29 may be made of a plurality of layers laminated.

In a relationship between the first and second magnetic layers 26 and 29, it is preferable to set them so that $Mr1 \times t1 < Mr2 \times t2$ holds where Mr1 and Mr2 denote residual magnetization in the first magnetic layer 26 and residual magnetization in the second magnetic layer 29, and t1 and t2 denote respective film thicknesses. Thereby, the second magnetic layer 29 has magnetization in the same direction as that of the net residual area magnetization, and it is possible to accurately record information to the second magnetic layer 29 corresponding to a position at which a recording magnetic field of the magnetic head is inverted. It is also possible that a setting is made such that $Mr1 \times t1 > Mr2 \times t2$. As a result of the first magnetic layer 26 and the second magnetic layer 29 being made to be thin films, the above-mentioned problem otherwise occurring at a time of recording is solved.

In a case where the setting is made such that $Mr1 \times t1 < Mr2 \times t2$, the respective Curie temperatures Tc1 and Tc2 of the first and second magnetic layers 26 and 29 may be such that $Tc1 < Tc2$ or $Tc1 > Tc2$ as described above for the principle of the present invention. This situation is same also in the case of setting of $Mr1 \times t1 > Mr2 \times t2$. Since the in-plane magnetic recording medium 20 is used or stored normally at a room temperature, Tc1 and Tc2 should be higher than the room temperature.

By setting the composition of the first magnetic layer 26 or the second magnetic layer 29 so that the compensation temperature may be lower than the room temperature, it is possible to increase the residual magnetization in the first magnetic layer 26 or the second magnetic layer 29 by heating, as a result of appropriately selecting the heating temperature at this time, and thus, it is possible to increase the net residual area magnetization.

Further, it is also possible to make a setting such that the residual area magnetization of the first magnetic layer 26 and the second magnetic layer 29 may become approximately such that $Mr1 \times t1 = Mr2 \times t2$ around the room temperature. Thereby, it is possible to remarkably reduce a demagnetizing field from an adjunct bit, and thus, it is possible to greatly improve thermal stability of written bits. In this case, it is preferable that a servo signal is previously recorded such as in a servo build-in type medium. Thereby, even when at a time of non heating condition, access to a target track is enabled. However, it is also possible to make such a difference between $Mr1 \times t1$ and $Mr2 \times t2$ that a servo signal recorded in the inplain magnetic recording medium 20 at a low recording line density may be reproduced without heating. For example, a setting may be made such that the net residual area magnetization |Mr1×t1−Mr2×t2| may lie in a range between 1.26 nTm and 5.02 nTm (0.1 memu/cm$^2$ and 0.4 memu/cm$^2$) so that, around the room temperature, output may be reduced by 10% through 80% from output of the conventional in-plane magnetic recording medium.

A film thickness of the above-mentioned protective layer 30 may be set in a range between 0.5 nm and 10 nm (preferably, in a range between 0.5 nm and 5 nm), and, for example, is made of a diamond like carbon, carbon nitride, amorphous carbon or such.

The above-mentioned lubrication layer 31 is made from an organic liquid lubricant having perfluoropolyether as a main chain with a terminal group of —OH, a benzene ring or such. Specifically, the lubrication layer 31 may have a thickness in a range between 0.5 nm and 3.0 nm, and, ZDol (provided by Monte Fluos Co. Ltd., with the terminal group of —OH), AM3001 (provided by AUSIMONT KK, with the terminal group of benzene ring), Z25 (provided by Monte Fluos Co. Ltd.) or such may be applied. The lubricant is appropriately selected to be suitable for the material of the protective layer 30. The above-mentioned respective layers except the lubrication layer 31 are produced by a sputtering method, a vacuum deposition method or such. The lubrication layer 31 is produced by a dip coating method, a spin coater method or such, and, in a case where the in-plane magnetic recording medium 20 is a tape-like one, a die coating method or such may be applied.

According to the first embodiment, as a result of the first magnetic layer 26 and the second magnetic layer 29 making antiferromagnetically exchange coupling therebetween being made to have respective temperature changes different from one another, it is possible to obtain the net residual area magnetization which is larger than that around the room temperature by heating them. Thereby, it is possible to increase reproduction output. Accordingly, it is possible to improve the S/N ratio remarkably from that in the conventional in-plane magnetic recording medium. Furthermore, around the room temperature, it is possible to reduce the net area magnetization, and thus, it is possible to control a demagnetizing field from an adjunct bit so as to improve the thermal stability of written bits.

Furthermore, in the in-plane magnetic recording medium 20 in the first embodiment, also in a recording process, the same as in the reproduction process, a portion at which recording is made may be heated at a time of applying a recording magnetic field. Thereby, a coercive force in the first magnetic layer 26 and the second magnetic layer 29 decreases, and thus, it is possible to reduce a recording magnetic field required for switching a magnetization direction. Further, since residual magnetization of each of the first and second magnetic layers 26 and 29 is reduced from that around the room temperature, and exchange coupling effect therebetween also decreases, as a result an exchange magnetic field applied to one another decreases, thereby carrying out of rotation of magnetization direction is made easier, and thus, overwrite performance is further improved.

A specific example of the first embodiment of the present invention is described next. First, a magnetic disk in a reference example was produced for measuring temperature change in residual magnetization of the first magnetic layer. The magnetic disk in this reference example had a specific configuration of glass substrate/CrTi layer (with a thickness of 25 nm)/AlRu layer (with a thickness of 15 nm)/CrMo layer (with a thickness of 5 nm)/CoCrTa layer (with a thickness of 1 nm)/CoCrTaGd layer as the first magnetic layer (with a thickness of 10 nm)/diamond like carbon (DLC) layer (with a thickness of 4.0 nm). The CoCrTaGd layer has a specific configuration of $(Co_{82}Cr_{13}Ta_5)_{100-x}Gd_x$, where x=0, 8 or 16 atomic %. Each of the numeric values in the composition is expressed in atomic %. A DC magneto-sputtering apparatus was used for producing these films.

Figure 5:
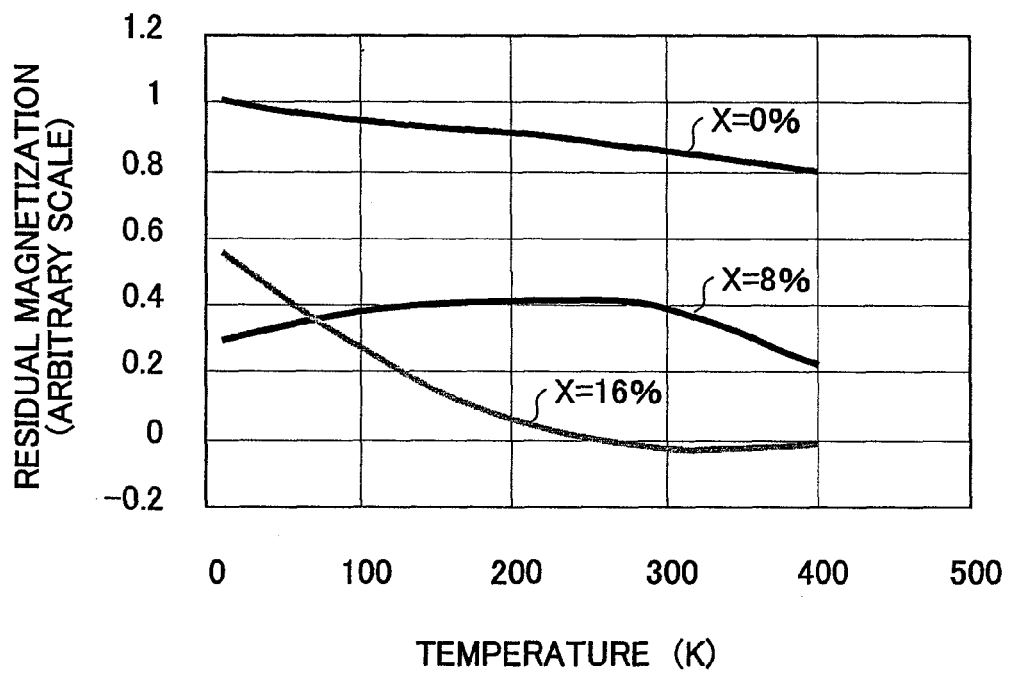
FIG. 5 shows temperature characteristics of residual magnetization in a magnetic disk in a reference example.

FIG. 5 shows temperature characteristics in the magnetic disk in the reference example. As shown, it can be seen that, with respect to a case of x=0 atomic %, the residual magnetization at 400 K remarkably decreases from that at 300 K in a case of x=8 atomic %. In other words, it can be seen that, by using a magnetic layer having the composition of x=8 atomic % as the first magnetic layer with selecting the thicknesses of the first magnetic layer and the second magnetic layer so that the net residual area magnetization at 300 K may lie within a desired range, it is possible to configure the in-plane magnetic recording medium 20 according to the first embodiment of the present invention in which the heating temperature is set as 400 K, for example.

Further, in the composition of x=16 atomic %, the residual magnetization becomes 0 (compensation temperature) around 270 K, and the residual magnetization increases at 350 K from 270 K. By using a magnetic layer having the composition of x=0 atomic % as the first magnetic layer while a magnetic layer having the composition of x=16 atomic % as the second magnetic layer, it is possible to increase the net residual area magnetization by heating it to 350 K for example. That is, it can be seen that, by using a magnetic layer having ferrimagnetism having the compensation temperature below the room temperature, it is possible to increase the residual magnetization and to increase the net area magnetization by heating it to an appropriate temperature around such a temperature above the compensation temperature and in which the residual magnetization may become maximum. The temperature measurement for the residual magnetization was carried out with the use of a SQUID apparatus.

As a magnetic disk as a specific example of according to the first embodiment of the present invention, the following configuration was produced, in the above-described magnetic disk in the reference example; glass substrate/CrTi layer (with a thickness of 25 nm)/AlRu layer (with a thickness of 15 nm)/CrMo layer (with a thickness of 5 nm)/CoCrTa layer (with a thickness of 1 nm)/CoCrTaGd layer (($Co_{81}Cr_{14}Ta_5)_{92}$ $Gd_8$, with a thickness of 2 nm)/Ru layer (with a thickness of 0.7 nm)/CoCrPtB layer ($CoCrPt_{14}B_5$ layer, with a thickness of 12 nm)/DLC layer (with a thickness of 4.0 nm)/lubrication layer (AM3001, with a thickness of 1.2 nm).

Figure 6:
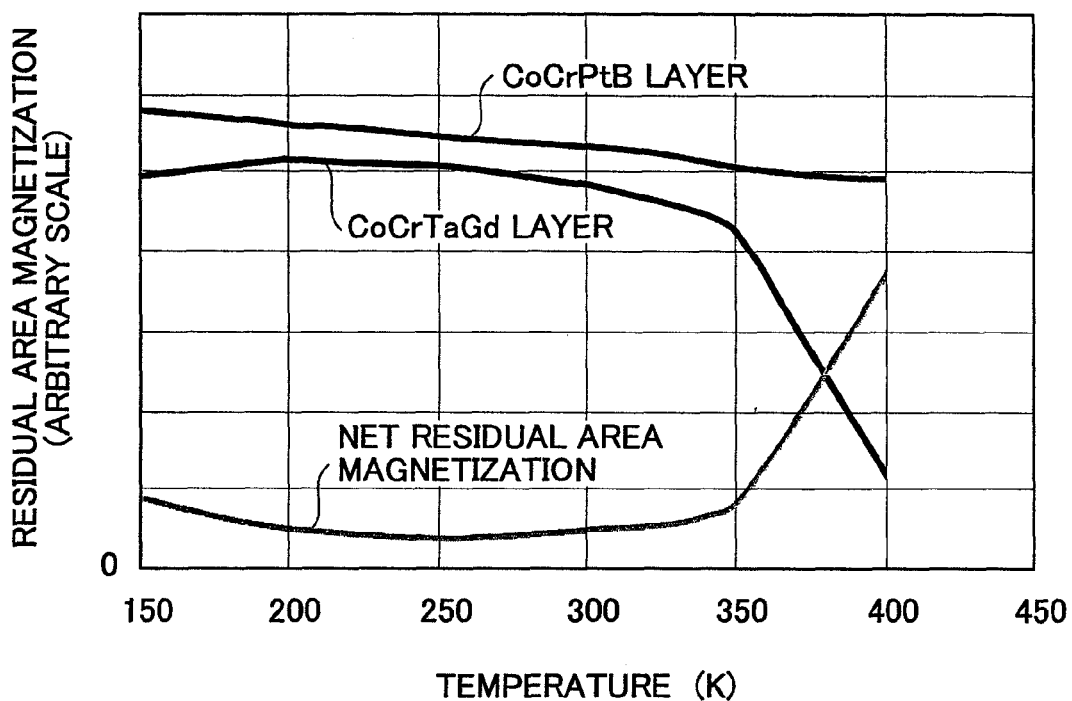
FIG. 6 shows temperature characteristics of residual area magnetization in a magnetic disk in a first embodiment of the present invention.

FIG. 6 shows temperature characteristics of residual area magnetization of the above-mentioned magnetic disk in the specific example according to the first embodiment of the present invention. As shown, the residual area magnetization in the CoCrTaGd layer sharply decreases from around 350 K, while change in the residual area magnetization of the CoCrPtB layer is small. Therefrom, it can be seen that the net residual area magnetization sharply increases from around 350 K. Accordingly, by selecting the heating temperature from a range between 350 K and 400 K, it is possible to obtain high reproduction output and high S/N ratio. The data of the residual area magnetization of each of the CoCrTaGd layer and the CoCrPtB layer was obtained from measurement carried out independently on the magnetic disk having the above-mentioned configuration.

The number of recording layers is not limited to the two in the first embodiment of the present invention, and, the recording layers may include more than two layers as long as the configuration according to the present invention is provided.

Specifically, at least two of these layers make exchange coupling, and also, the magnetic layers are selected so that the residual area magnetization increases as a result of being heated.

Figure 7:
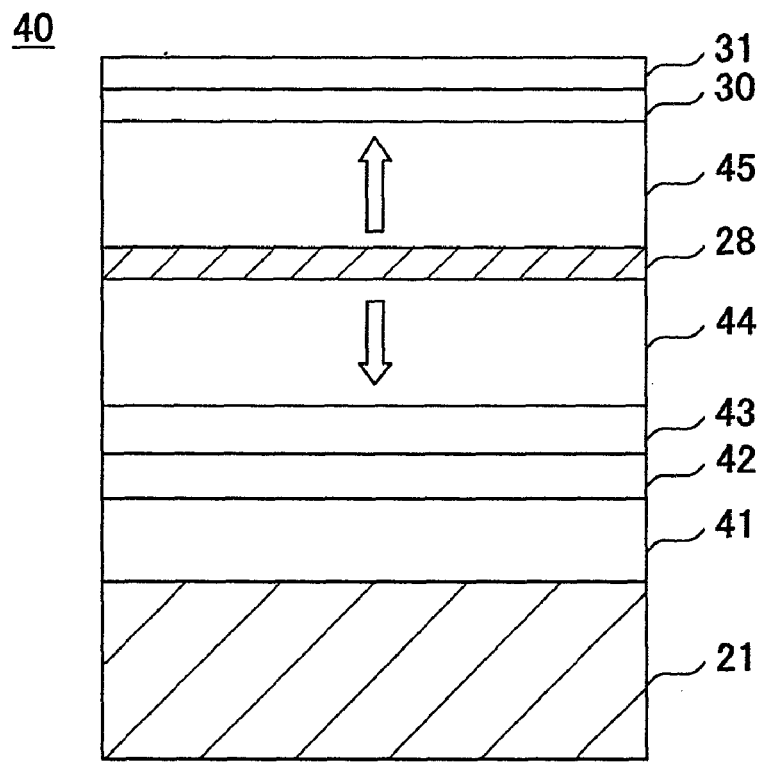
FIG. 7 shows an elevational sectional view of a vertical magnetic recording medium according to a second embodiment of the present invention.

A second embodiment of the present invention is described next. FIG. 7 shows an elevational sectional view of a vertical magnetic recording medium according to the second embodiment of the present invention. In the figure, the same reference numerals are given to parts corresponding to those described above, and duplicated description is omitted.

As shown, the vertical magnetic recording medium 40 according to the second embodiment of the present invention has a configuration in which, on a substrate 21, a soft magnetic backed layer 41, a seed layer 42, a non-magnetic intermediate layer 43, a first vertical magnetic film 44, a non-magnetic coupling layer 28, a second vertical magnetic film 45, a protective layer 30 and a lubrication layer 31, laminated in the stated order.

The soft magnetic backed layer 41 has a thickness of, for example, in a range between 50 nm and 2 μm, and is made from an amorphous or micro crystalline alloy containing at least one element selected from among Fe, Co, Ni, Al, Si, Ta, Ti, Zr, Hf, V, Nb, C and B, or laminated films of these alloys. In terms of enabling concentration of a recording magnetic field, it is preferable to apply soft magnetic material having more than 1.0 T of saturation magnetic flux density. For example, FeSi, FeAlSi, FeTaC, CoNbZr, CoCrNb, NiFeNb or such may be employed. The soft magnetic backed layer 41 is produced by a plating method, a sputtering method, a deposition method, a CVD (chemical vapor deposition) method, or such. The soft magnetic backed layer 41 is used to absorb almost all the magnetic fluxes from a recording head, and it is preferable that a value of product between the saturation magnetic flux density Bs and the film thickness is larger in terms of carrying out saturation recording. Further, it is preferable that the soft magnetic backed layer 41 has an increased high-frequency magnetic permeability in terms of enabling writing at a high transfer rate.

The seed layer 42 has a thickness of, for example in a range between 1.0 nm and 10 nm, and material thereof is selected from among Ta, C, Mo, Ti, W, Re, Os, Hf, Mg and an alloy thereof. Thereby, it is possible to improve crystallinity of the non-magnetic intermediate layer 43 formed thereon and also, to break a relationship of crystal orientation and crystal growth between the soft magnetic backed layer 41 and the non-magnetic intermediate layer 43. This seed layer 42 may be provided or may not be provided The non-magnetic intermediate layer 43 has a thickness of, for example, in a range between 2 nm and 30 nm, is made from non-magnetic material such as Co, Cr, Ru, Re, Ri, Hf or an alloy thereof. For example, an Ru film, an RuCo film, a CoCr film or such may be applied thereto, and it is preferable that the non-magnetic intermediate layer 43 has an hcp structure. As a result, in a case where the first vertical magnetic film 44 and the second vertical magnetic film 45 has hcp structures, epitaxial growth thereof is enabled, and crystallinity can be improved.

The first vertical magnetic film 44 and the second vertical magnetic film 45 are so-called vertical magnetic films having a magnetization easy axis lying in the thickness direction, each has a thickness in a range between 3 nm and 30 nm, and each is made from any material selected from among a group of a Co alloy, a Ni alloy, a Fe alloy, or a Co alloy containing CoPt, CoCrTa, CoCrPt, CoPt-M or CoCrPt-M, where M denotes one selected from among B, Mo, Nb, Ta, W and Cu. Especially, it is preferable to employ material obtained from adding, to the above-mentioned alloy, at least one element from among rare-earth elements including Gd, Tb, Dy, Pr, Nd, Yb, Sm, Ho and Er. As described above for the first embodiment, in these alloys, polycrystal in which crystal grains are separated by crystal boundaries is produced, spins which Co atoms and, for example, Gd atoms of the crystal grains have a ferrimagnetic arrangement, and thus, become anti-parallel to one another. By controlling an adding amount of these rare earth elements, it is possible to control the compensation temperature or the Curie temperature. In such a ferromagnetic alloy, crystal grains have columnar structures in a perpendicular direction with respect to the substrate plane (thickness direction), a growth direction lies in a (001) plane in a case of the hcp structure, and the magnetic easy axis occurs in the thickness direction (such a film being simply referred to as 'vertical continuous film' hereinafter).

The first vertical magnetic film 44 and the second vertical magnetic film 45 couple with one another antiferromagnetically in a manner of exchange coupling by means of the non-magnetic coupling layer 28 produced therebetween. The non-magnetic coupling layer 28 has a thickness in a range between 0.2 nm and 1.5 nm (preferably, in a range between 0.2 nm and 0.5 nm) in a case of Ru, or, in a range between 0.2 nm and 1.5 nm which may vary depending on an Ru content therein in a case of Ru alloy. By setting the thickness of the non-magnetic coupling layer 28 in this range, magnetization in the first vertical magnetic film 44 and magnetization in the second vertical magnetic film 45 couple with one another antiferromagnetically, and lie in anti-parallel to one another in a state in which no external magnetic field is applied. Especially, the thickness of the non-magnetic coupling layer 28 is preferably determined so as to correspond to the first antiferromagnetic peak (a peak on the thinnest film thickness side) of vibration-type exchange coupling depending on this thickness.

Relationships of the Curie temperatures and the residual area magnetization in the first vertical magnetic film 44 and the second vertical magnetic film 45 are set, the same as those in the above-described first embodiment of the present invention. The materials are selected so that the net residual area magnetization |Mr1×t1−Mr2×t2| increases when they are heated from around the room temperature, where Mr1 and Mr2 denote respective ones of residual magnetization in the first vertical magnetic film 44 and residual magnetization in the second vertical magnetic film 45, and t1 and t2 denote respective film thicknesses.

Further, it is preferable to perform setting such that Mr1×t1<Mr2×t2. Thereby, the second vertical magnetic film 45 has magnetization in the same direction as that of the net residual area magnetization, information can be accurately recorded in the second vertical magnetic film 45 corresponding to a position at which a recording magnetic field of a magnetic head is inverted, a width of magnetization transition zone can be narrowed, and, since the second vertical magnetic film 45 which carries magnetic leakage field at a time of reproduction is near to the magnetic head, resolution is improved.

At least one of the first and second vertical magnetic films 44 and 45 may contain non-magnetic material including a compound of at least any one element from among Si, Al, Ta, Zr, Y and Mg, with at least one element from among O, C and N, and may have a non-magnetic phase which physically separates a crystal grain having a columnar structure in the above-mentioned ferromagnetic alloy from an adjacent crystal grain (such a structure being simply referred to as a 'columnar granular structure', hereinafter). For example, (CoPt)—($SiO_2$), (CoCrPt)—($SiO_2$), (CoCrPtB)—(MgO) or such may be employed. Since the magnetic grain form a columnar structure and the non-magnetic phase is produced to surround the magnetic grain, the magnetic gains are separated from each other, thus, interaction between the magnetic gains is effectively reduced or broken, and thus, it is possible to reduce medium noise.

In a case where the columnar granular structure is applied to any one of the first vertical magnetic film 44 and the second vertical magnetic film 45, the above-described vertical continuous film may be employed as the other one. For example, by employing (CoCrTa)—(SiO$_2$) of the columnar granular structure as the first vertical magnetic film 44 while employing the vertical continuous film of CoCrPtB as the second vertical magnetic film 45, it is possible to control a reduction rate of residual magnetization occurring due to temperature rise, also as a result of selecting the size and separation of the crystal grains. Thereby, it is possible to increase the net area magnetization |Mr1×t1−Mr2×t2| at a time of heating.

Furthermore, at least one of the first and second vertical magnetic films 44 and 45 may be made of an artificial lattice film of Co/Pd, CoB/Pd, Co/Pt, CoB/Pt or such. The artificial lattice film is produced, for example, as a result of CoB (with a thickness of 0.3 nm)/Pd (with a thickness of 0.8 nm) being alternately laminated to form finally five layers through 30 layers. Such an artificial lattice film has a large vertical magnetic anisotropy, and thereby, provides superior thermal stability.

In the second embodiment, temperature change is made different between the first vertical magnetic film 44 and the second vertical magnetic film 45 making antiferromagnetically exchange coupling therebetween, and the vertical magnetic recording medium is heated. Thereby, it is possible to obtain the net residual area magnetization larger that that around the room temperature, and thus, it is possible to increase reproduction output. Accordingly, it is possible to increase the S/N ratio from that in the conventional vertical magnetic recording medium. Further, around the room temperature, the net residual area magnetization can be reduced, thereby the demagnetizing field can be controlled at this time, and, as a result, it is possible to improve the thermal stability in written bits.

Figure 8:
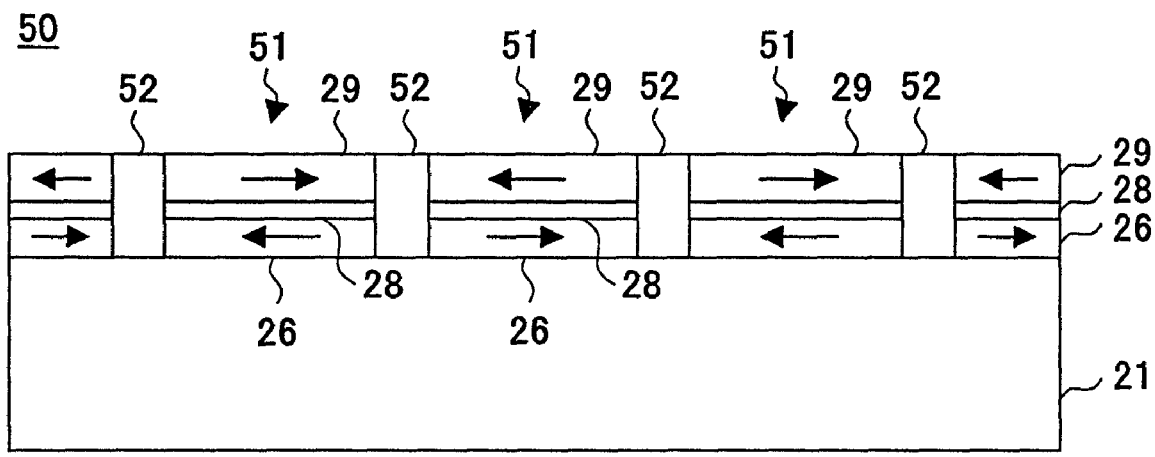
FIG. 8 shows an elevational sectional view of a patterned medium according to a third embodiment of the present invention.

A third embodiment of the present invention is described next. FIG. 8 shows an elevational sectional view of a patterned medium according to the third embodiment of the present invention. The same reference numerals are given to parts corresponding to those described above, and duplicated description is omitted.

As shown in FIG. 8, the patterned medium 50 includes a substrate 21, laminated members 51 cyclically arranged on the substrate 21, and non-magnetic parts 52 separating these laminated members 51 from each other. Each of the laminate members 51 has the same configuration as that of the in-plane magnetic recording medium according to the first embodiment or the vertical magnetic recording medium according to the second embodiment described above. Here, the in-plane magnetic recording medium is used as an example. For the purpose of simplification of description, only the first magnetic layer 28, the non-magnetic coupling layer 28 and the second magnetic layer 29 thereof are shown, and the other parts are omitted.

The patterned medium 50 has a configuration such that the laminated members 51 in each of which the first magnetic layer 26 and the second magnetic layer 29 make antiferromagnetically couple with one another are arranged cyclically with the non-magnetic parts 52 separating therebetween. A size of each of the laminated members 51 is, for example, 30 nm×30 nm, and each non-magnetic part 52 has a width of, for example, 10 nm. Since the laminated members 51 are separated from each other by the non-magnetic parts 52, it is possible to reduce interaction between adjacent ones of the laminated members 51 so that medium noise can be reduced.

However, when a demand for a higher recording density may result in reduction in the separation between adjacent laminated members 51 which thereby approach each other much, magnetostatic interaction therebetween becomes enlarged. However, as described for the first embodiment above, according to the present invention, in the patterned medium 50, since the net residual area magnetization is reduced between the first and second magnetic layers 26 and 29 around the room temperature, a magnetic field leaking from the laminated members 51 are reduced, and thus, it is possible to control demagnetizing fields applied to adjacent laminated members 51. Accordingly, it is possible to control the magnetostatic interaction, thereby the thermal stability can be improved and also the medium noise can be reduced.

In order to produce the patterned medium 50 according to the third embodiment, after an in-plane magnetic recording medium according to the first embodiment is formed, a silicon oxide (not shown) is formed on the surface of the second magnetic layer 29 thereof, then, further thereon, a resist film (not shown) is formed, and grinding therein is carried out up to the first magnetic layer 26 by a photolithography method or an RIE method. After that, the non-magnetic parts 52 are produced by filing the thus-formed grooves with silicon oxide, diamond-like carbon or such. Finally, the silicon oxide or such on the surface thus formed is planarized. In the photolithography method, an electron beam drawing method may be applied for example. Thereby, it becomes possible to carry out microscopic drawing on the order of tens of nanometers.

Figure 9:
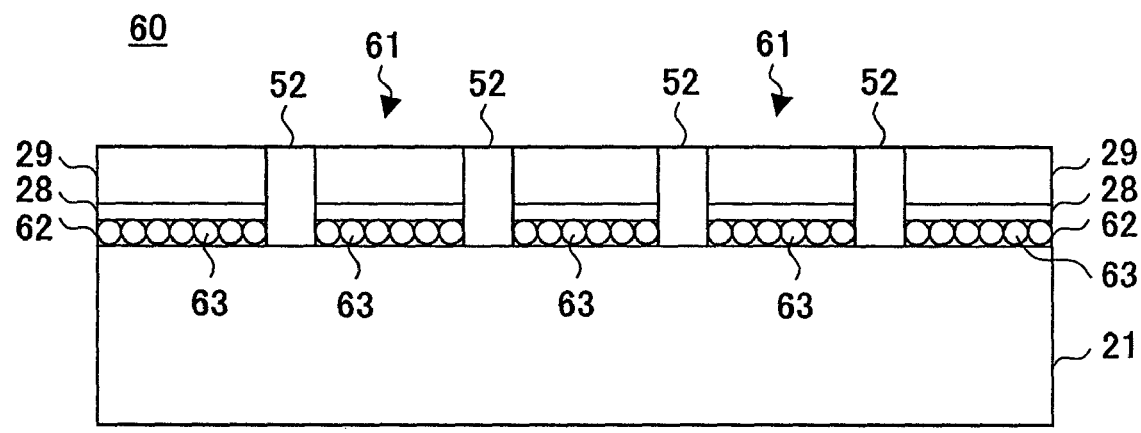
FIG. 9 shows an elevational sectional view of a patterned medium according to a first variant embodiment of the third embodiment of the present invention.

FIG. 9 shows a patterned medium 60 according to a first variant embodiment of the third embodiment of the present invention described above. In the patterned medium 60, a first magnetic layer 62 of each laminated member 61 includes nanoparticles 63 of ferromagnetic material arranged in a self assembling manner. The nanoparticles 63 make exchange coupling with a second magnetic layer 29 antiferromagnetically via a non-magnetic coupling layer 28. Temperature characteristics of magnetization in the ferromagnetic material of the nanoparticles 63 are adjusted by means of the ferromagnetic material which is a Co alloy, a Ni alloy, a Fe alloy or such. Specifically, the temperature characteristics of the residual magnetization can be controlled by adjacent of a particle size of the nanoparticles 63, separation of the nanoparticles 63, a degree of magnetic coupling between the nanoparticles 63, composition thereof, or, phase transition temperature such as a Curie temperature. By thus utilizing the nanoparticles 63, it is possible to easily perform control of the characteristic values. Thereby, it is possible to improve the accuracy of controlling the temperature characteristics. Further, although an example of a single layer of nanoparticles 63 is produced is shown in FIG. 9, a plurality of these layers may be provided. Also in such a case, since adjacent nanoparticles 63 make ferromagnetically exchange coupling with each other, the first magnetic layer 62 made of these nanoparticles 63 makes antiferromagnetically exchange coupling with the second magnetic layer 29.

Figure 10:
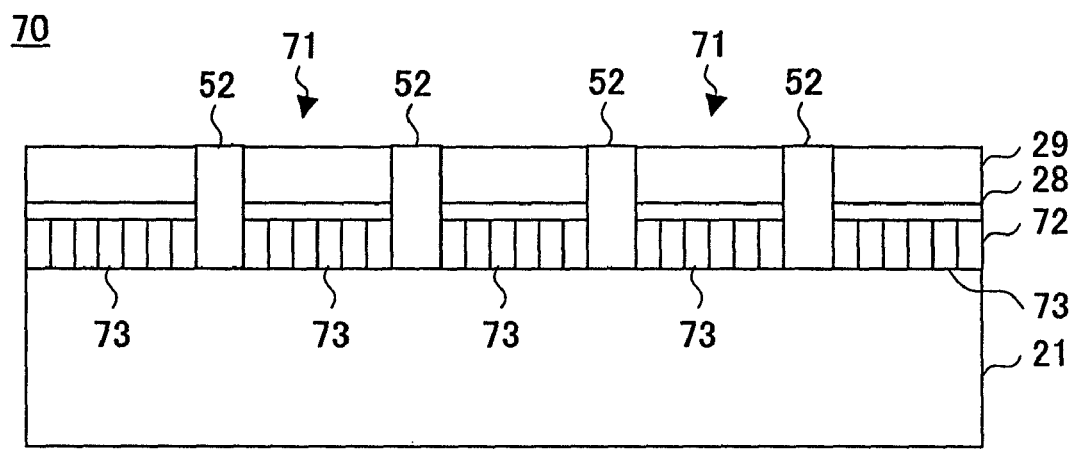
FIG. 10 shows an elevational sectional view of a patterned medium according to a second variant embodiment of the third embodiment of the present invention.

Further, as shown in FIG. 10, which shows a second variant embodiment of the third embodiment of the present invention, in each laminated member 71, a first magnetic layer 72 may employ crystal grains 73 each of which is a microscopic in-plane continuous film or vertical continuous film, or may employ a columnar granular film described above for the second embodiment. In such a case, the Curie temperature is appropriately controlled by means of a grain size, material or such of the crystal gains.

A method of producing the patterned medium is not limited to that described above and another well-known method may be applied. For example, the above-mentioned laminated members may be embedded in cavities cyclically produced in a substrate 21. Alternatively, a substrate of a servo built-in type, a substrate of a land and groove type or such may be employed instead.

Figure 11:
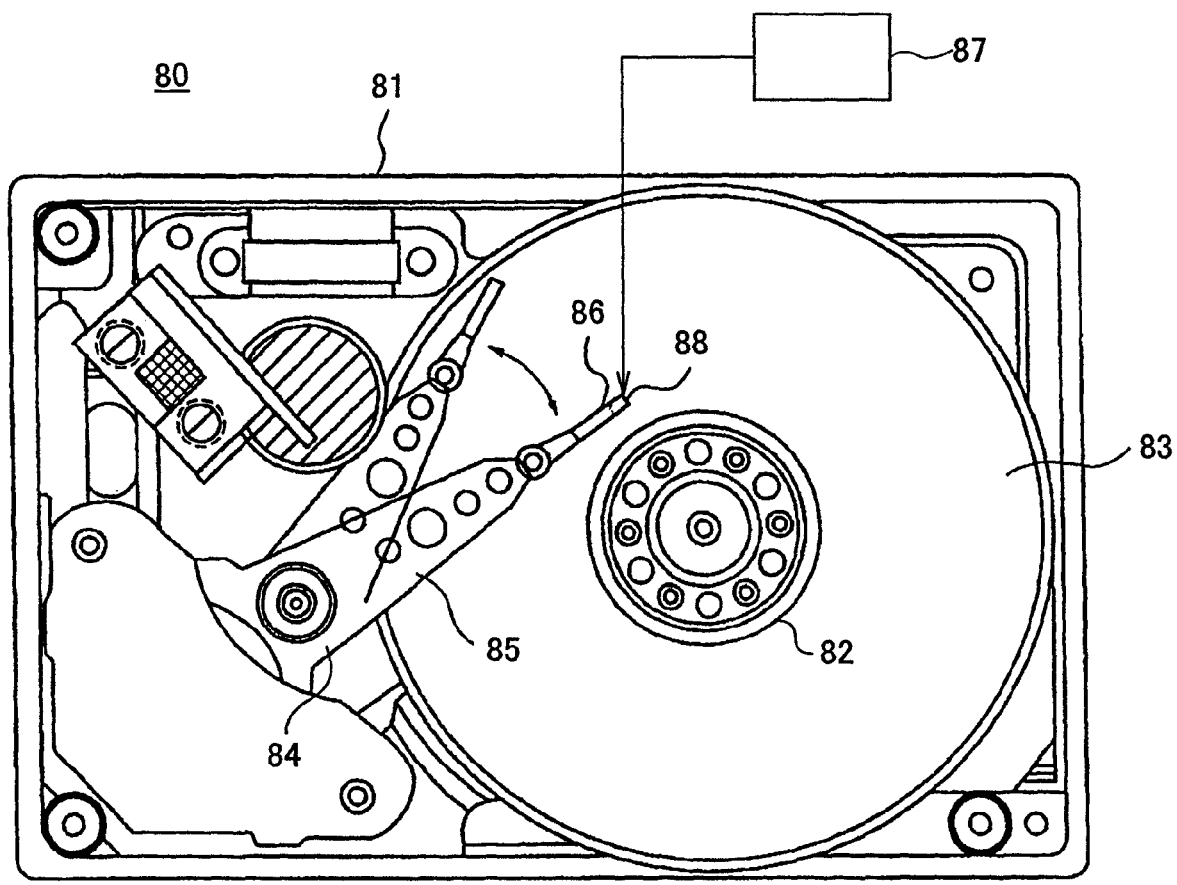
FIG. 11 partially shows a plan view of a magnetic storage according to a fourth embodiment of the present invention.

A fourth embodiment of the present invention is described next. FIG. 11 generally shows a magnetic storage according to the fourth embodiment of the present invention.

As shown, the magnetic storage 80 according to the embodiment includes a housing 81. In the housing 81, a hub 82 driven by a spindle (not shown), a magnetic recording medium 83 fixed to the hub 82 and rotated thereby, an actuator unit 84, an arm 85 and a head suspension 86 mounted on the actuator unit 84 and moved in a radial direction of the magnetic recording medium 83, and a head slider 88 supported on the head suspension 86. To the head slider 88, a laser irradiation optical system 87 for applying a laser beam so as to heat the magnetic recording medium 83 is connected. The laser irradiation optical system 87 includes a laser light source such as a semiconductor laser, an optical fiber, a converging optical system or such for leading the laser beam to the head slider 88.

Figures 12, 13:
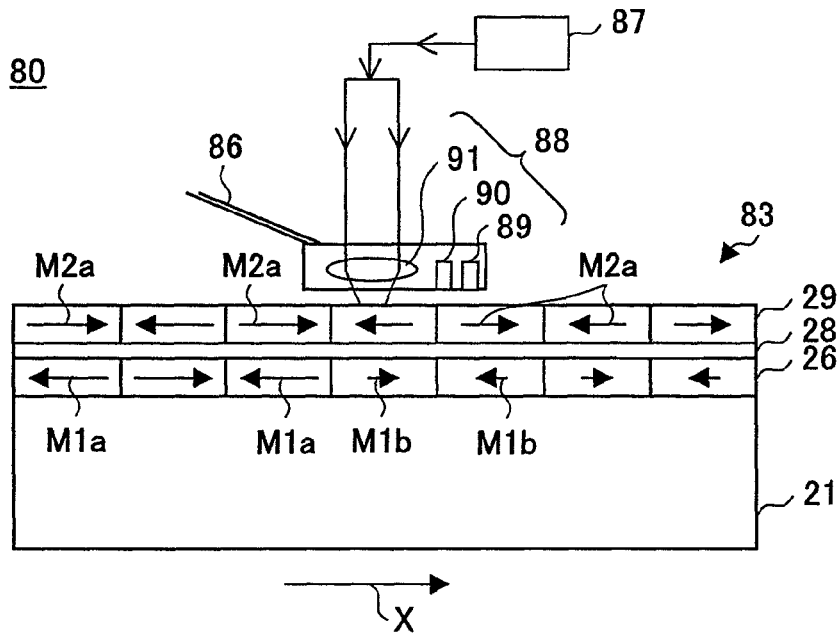
FIG. 12 partially shows an elevational sectional view of the magnetic storage according to the fourth embodiment of the present invention.
FIG. 13 shows magnetic characteristics of a magnetic disk 1 and a magnetic disk 2.

FIG. 12 shows an elevational sectional view of a part of the magnetic storage shown in FIG. 11. The same reference numerals are given to parts corresponding to those described above, and duplicated description is omitted.

As shown in FIG. 12, the head slider 88 includes a recording device 89, a GMR reproduction device 90 and a converging lens 91. As the recording device 89, a ring-shaped thin-film induction type recording device, i.e., a single magnetic pole head is employed in a case where the magnetic recording medium is a vertical magnetic recording medium. Further, as the GMR reproduction device 80, a well-known one may be employed. Instead of the GMR reduction device, a TMR (ferromagnetic tunnel junction magneto resistive) device, a ballistic MR device or such may be employed. As the magnetic recording medium 83, the in-plane magnetic recording medium according to the first embodiment is applied, for example.

A recording process in this magnetic storage 80 is described next. In the magnetic storage 80, the head slider 88 floating on the magnetic recording medium 83 moving in an arrow A applies a laser beam (for example, with a wavelength of 685 nm) so as to heat the surface of the magnetic recording medium 83 in particular at a track thereof to record by means of the laser irradiation optical system 87, and thus performs recording desired information thereon with the recording device 89 applying a recording magnetic field. A spot diameter of the laser beam (a diameter at which a relative intensity become 50% of a peak intensity) is set as being in a range between 0.1 and 20 times the track width, to record, for example. The spot diameter of the laser beam is preferably in a range between 5 and 10 times the track width in terms of easiness of realizing it technically. In terms of thermal influence on a track adjacent to the track to record on, a range between 1 and 5 times the track width is preferable. In the magnetic storage according to the present invention embodiment, even when the spot diameter of the laser beam is set larger than the track width, the track width becomes equal to a core width of the recording device 89. In other words, the spot diameter of the laser beam may be set larger than the core width of the recording device 89. However, the spot diameter may be set smaller than the core width of the recording device 89 so as to utilize thermal diffusion to from a track width approximately equal to the core width of the recording device 89.

Output of the laser beam is approximately determined depending on composition of the first magnetic layer 26 and the second magnetic layer 29, the predetermined spot diameter or such. For example, it is set in a range between 0.1 mW and 20 mW, preferably, in a range between 1 mW and 5 mW.

As a result of the laser beam being applied, the temperature in the first magnetic layer 26 and the second magnetic layer 29 increases to 100 through 200° C., for example, thereby, a magnetocrystalline anisotropy constant Ku or an anisotropic magnetic field decreases. As a result, even when the composition is such as that having large magnetocrystalline anisotropy constant Ku or anisotropic magnetic field around the room temperature, recording can be carried out easily even without increasing the recording magnetic field of the recording device 89 in the above-mentioned condition in which this factors decrease. Accordingly, it is possible to keep desired overwrite performance and bit error rate easily. Therefore, it is possible to employ material having a large magnetocrystalline anisotropy constant Ku as the first magnetic layer 26 and/or the second magnetic layer 29, for which it is not possible to carry out recording due to deterioration of the overwrite performance in the conventional recording method in which the heating is not performed. For example, in a case where the first magnetic layer and/or the second magnetic layer 29 is made from a CoCrPt alloy, it is preferable to set a Pt amount in a range between 12 atomic % and 35 atomic %. As a result, it is possible to increase a thermal stability index expressed by $KuV/k_BT$, and thus, to improve the thermal stability. Especially, it is preferable to employ material having larger magnetocrystalline anisotropy constant Ku or anisotropic magnetic field as material of the second magnetic layer 29 than that of the first magnetic layer 26. In fact, since the second magnetic layer 29 located nearer to the head slider 88 has a large recording magnetic field applied thereto than that applied to the first magnetic layer 26, it is possible to efficiently increase the thermal stability with a lower recording magnetic field as a result of material having a larger magnetocrystalline anisotropy constant Ku or anisotropic magnetic field being used as material of the second magnetic layer 29.

Furthermore, in addition to increasing the magnetocrystalline anisotropy constant Ku of the first magnetic layer 26 and/or the second magnetic layer 29, a saturation magnetization Ms may be increased so that increase in the anisotropy magnetic field Hk (=2Ku/Ms) may be reduced. In fact, since the recording magnetic field in the recording device 89 required to carry out saturation recording is approximately in proportion to the anisotropy magnetic field Hk, it is possible to reduce the recording magnetic field and the laser output. Specifically, in a case where the first magnetic layer 26 and/or the second magnetic layer 29 is made from a CoCrPt alloy, a Pt amount and a Co amount should be increased on the atomic concentration basis, and the elements other than Pt and Co should be reduced. Further, in case where the first magnetic layer 26 and/or the second magnetic layer 29 is made from polycrystal material including crystal grains of a CoCrPt alloy, thermal treatment may be carried out, Cr segregation may be promoted, and Co concentration in the crystal grains may be increased.

Further, it is preferable to set $KuV/k_BT$ of the magnetic recording medium 83 in a heated state at an area having the laser beam applied thereto as being more than 15 (further preferably more than 45). At the area having the laser beam applied thereto, a portion to which the recording magnetic filed is applied by the recording device 89 has magnetization inversion or such occurring therein and thus new information is recorded, while thermal stability of residual magnetization at a portion at which no recording magnetic field is applied, especially, thermal stability of the residual magnetization in the second magnetic layer 29 increases. Normally, in a hard disk drive for which a strict thermal stability requirement is applied, an allowable value is approximately 10% reduction in residual magnetization for ten years in a case where it is stored in the room temperature. $KuV/k_BT=15$, mentioned above, is determined from consideration of reduction in the residual magnetization occurring when laser beam application is performed ten thousand times, assuming that each time of laser beam application is carried out for 10 ns.

Furthermore, $KuV/k_BT$ of the magnetic recording medium 83 at a heated condition in an area to which the laser beam is applied is preferably below 80 in a case where the first magnetic layer 26 or the second magnetic layer 29 is of a continuous film, in terms of influence due to the heating such as thermal deformation or such of the substrate 21 in the recording medium, or a saturation magnetic field density of magnetic pole material which is technically available at the present time for the recording device 89. The above-mentioned case where the first magnetic layer 26 or the second magnetic layer 29 is of a continuous film includes, as long as it is the continuous film, not only a case of the first magnetic layer 26 or the second magnetic layer 29, but also a case of the first vertical magnetic film or the second vertical magnetic film according to the second embodiment, a case of the first magnetic layer or the second magnetic layer according to the third embodiment, or a case of a magnetic layer of a magnetic recording medium having a single magnetic layer. In a case of a magnetic layer having magnetic grains having columnar granular structures or a patterned medium in which magnetic grains are regularly disposed in a non-magnetic substrate, the above-mentioned $KuV/k_BT$ of the magnetic recording medium 83 at a heated condition in an area to which the laser beam is preferably set less than 1500, and more preferably, less than 300. The above-mentioned continuous film means a film in which a non-magnetic region is formed around a magnetic grain thanks to segregation of crystalline magnetic grains or such.

Thus, $KuV/k_BT$ of the magnetic recording medium 83 at a heated condition in an area to which the laser beam is applied is preferably in a range between 15 and 80 in a case where the first magnetic layer 26 or the second magnetic layer 29 is a continuous film. In a case of a magnetic layer having magnetic grains in columnar granular structures, or a patterned medium in which magnetic grains are regularly disposed in a non-magnetic substrate, the same is preferably in a range between 15 and 1500.

In order to control $KuV/k_BT$ as described above, the above-described magnetocrystalline anisotropy constant Ku of the magnetic recording medium or the laser output is appropriately selected. $KuV/k_BT$ is obtained from, based on a formula (I) described later, measuring a so-called dynamic coercive force Hc' for various ones of a magnetic field switching interval 't'. Measurement of the dynamic coercive force Hc' is carried out with the use of an inverse DC degaussing method for example. In the inverse DC degaussing method, recording is carried out in a condition in which the above-mentioned temperature at the heated condition is set.

Further, due to the laser beam application, the amount of exchange interaction (exchange coupling magnetic field) between the first magnetic layer 26 and the second magnetic layer 29 decreases, rotation of magnetization in each of the first magnetic layer 26 and the second magnetic layer 29 can be carried out more easily than in a recording process around the room temperature, and thus, the overwrite performance is further improved.

The temperature to which the first and second magnetic layers 26 and 29 is heated due to the laser beam application is not limited to the 100° C., and any other temperature may be applied as long as it is higher than the temperature at which the magnetic recording medium 83 is normally used. In terms of thermal durability of the substrate, this heating temperature is preferably selected from a range below 400° C. In terms of crystallization in a case where the amorphous layer is employed as material of the foundation layer of the magnetic recording medium 83, a range below 200° C. is especially preferable, and a range below 150° C. is further preferable. In terms of thermal stability of the first magnetic layer 26 and/or the second magnetic layer 29, a range higher than 65° C. is preferable.

Further, the laser beam output, i.e., irradiation (laser application) energy applied to the magnetic recording medium 83 may be changed depending on a recording frequency. In other words, in a case of a high frequency, a high laser output may be applied, while in a case of a low frequency, a low output of laser beam may be applied. For example, for a magnetic disk 1 in a specific example described later, the laser output of 1 mW is applied for a recording frequency of 105 kHz, while 3 mW is applied for the recording frequency is 73 MHz, therebetween the laser output being set in proportion to the recording frequency. By applying such a setting, it is possible to achieve high resolution and also, it is possible to achieve power saving.

A reproduction process is described next. As shown in FIG. 12, in the magnetic storage 80, the head slider floating above the magnetic recording medium 83 moving in the arrow X direction applies a laser beam so as to heat the surface of the magnetic recording medium 83 in particular at a track thereof to reproduce information therefrom, and reproduces bits recorded in the magnetic recording medium 83 with the use of the GMR reproduction device 90. The first and second magnetic layers 26 and 29 are heated to a predetermined temperature, and magnetization M1a in the first magnetic layer 26 changes into magnetization M1b smaller in residual magnetization than that of magnetization M1a. On the other hand, similarly, magnetization M2a in the second magnetic layer 29 changes into magnetization M2b. However, since a reduction rate in the residual magnetization of the first magnetic layer 26 is larger than that of the second magnetic layer 29, and also, the film thickness is set approximately equal between the first and second magnetic layers 26 and 29, the net residual area magnetization thereof becomes larger in a heated state than that in a not heated state. Therefore, reproduction output in proportion to the net residual area magnetization thus increased thanks to the heating is obtained from the GMR reproduction element 90, and thus, the reproduction output increases and the S/N ratio increases.

A heating temperature at the reproduction process is set at a temperature at which the net residual area magnetization increases thanks to selection of the materiel, composition or such of the first magnetic layer 26 and/or the second magnetic layer 29, higher than a temperature at which the magnetic recording medium 83 is normally used. This heating temperature is selected from a temperature range in which both the residual magnetization in the first magnetic layer 26 and the residual magnetization in the second magnetic layer 29 do not vanish. It is preferable to select this temperature within this range and also, it is preferable to select from a range blow 400° C. in terms of heat durability of the substrate. Further, it is preferable to select from a range below 200° C. in terms of crystallization in a case where the amorphous layer is employed as material of the foundation layer of the magnetic recording medium 83, and a range below 150° C. is further preferable. Furthermore, in terms of thermal stability of the first magnetic layer 26 and/or the second magnetic layer 29, a range higher than 65° C. is preferable.

The magnetic recording material 82 is not limited to the in-plane magnetic recording medium according to the first embodiment. Alternatively, the vertical magnetic recording medium according to the second embodiment or the patterned medium according to the third embodiment may be employed. In the magnetic storage applying the recording process according to the present embodiment, the magnetic recording medium 83 is not limited to the magnetic recording medium in any one of the first through the third embodiments in which the net residual area magnetization increases as a result of the recording medium being heated. That is, as materials of the first and second magnetic layers 26 and 29, materials having approximately same temperature characteristics for residual magnetization, i.e., having similar compositions, for example, may also be employed. Further, a well-known synthetic ferrimagnetic material may also be employed. For example, the magnetic recording medium disclosed as an embodiment in Japanese Laid-open Patent Application No. 2001-056924 may be employed.

Furthermore, instead of the first magnetic layer/the non-magnetic coupling layer/the second magnetic layer according to the first embodiment or the first vertical magnetic film/the non-magnetic coupling layer/the second vertical magnetic film according to the second embodiment, a magnetic layer of a single layer having an in-plane orientation or a magnetic recording medium having a vertical magnetized film may be employed. Other than these, a magnetic recording medium having a magnetic layer with a magnetization orientation direction of approximately 45 degrees from a substrate surface, a magnetic layer with a magnetization orientation direction of larger than 0 degrees and smaller than 45 degrees from a substrate surface may also be employed.

Furthermore, the magnetic grains in the first magnetic layer or the second magnetic layer according to the first embodiment, the first vertical magnetic film or the second vertical magnetic film according to the second embodiment, the first magnetic layer or the second magnetic layer according to the third embodiment, the nanoparticles, the magnetic layer in the magnetic recording medium having the single magnetic layer, or the patterned medium in which the magnetic grains are regularly disposed in the non-magnetic substrate, is preferably made from CoPt, or from material having CoPt as a chief ingredient as well as B, Mo, Nb, Ta, W, Cu, Cr or an alloy thereof being added thereto. Furthermore, a Pt amount of these materials is in particular preferably in a range between 12 atomic % and 35 atomic % in a case where the magnetic layer is a continuous film. In a case where the magnetic layer is made from magnetic grains having columnar granular structures, nanoparticles, or magnetic particles of the patterned medium in which the magnetic grains are disposed regularly in the non-magnetic substrate, a setting in a range between 1 atomic % and 35 atomic % is especially preferable (further preferably, in a range between 1 atomic % and 25 atomic % in terms of achieving stability of hcp (hexagonal closest packing) structure). As a result, it is possible to increase the index of thermal stability expressed by $KuV/k_B T$, and improve the thermal stability. The above-mentioned setting is preferable in the case of the patterned medium in which magnetic grains are regularly disposed in the non-magnetic substrate, since, by increasing the magnetocrystalline anisotropy constant Ku and also increasing the saturation magnetization Ms of the magnetic grains, both the anisotropic magnetic field Hk and increase in the medium noise can be controlled easily.

Although the head slider 88 is of a lens integrated type in which the recording device 89, the GMR reproduction device and the converging lens 91 are provided integrally, the converging lens 91 and the laser irradiation optical system 87 may be provided separately from the head slider. Instead of the converging lens 91 and the laser irradiation optical system 87, any other device may be employed as long as it has a function of selectively heating a track on the magnetic recording medium to record thereto or reproduce therefrom.

The specific example of the above-described fourth embodiment of the present invention is described next. As the magnetic recording medium, a magnetic disk having the following configuration was used. In the magnetic disks 1 and 2, the composition of the second magnetic layer was made different therebetween, while a configuration from the glass substrate through the non-magnetic coupling layer was made in common. The configuration was produced including the glass substrate/CrTi layer (with a thickness of 25 nm)/AlRu layer (with a thickness of 15 nm)/CrMo layer (with a thickness of 5 nm)/CoCrTa layer (with a thickness of 1 nm)/CoCr layer (with a thinness of 1.5 nm)/Ru layer (with a thickness of 0.7 nm). Furthermore, on the second magnetic layer, a DLC film (with a thickness of 4 nm)/lubrication layer (with a thickness of 1.5 nm) were produced. The magnetic disks 1 and 2 having the second magnetic layers of the following materials, respectively, were produced:

the magnetic disk 1: $CoCrPt_{14}B$ layer (with a thickness of 15 nm); and the magnetic disk 2: $CoCrPt_{17}B$ layer (with a thickness of 15 nm).

In each of the magnetic disks 1 and 2, in a DC magnetron sputtering method, a substrate temperature was set at 240° C. or less, the CrTi layer through the DLC layer were produced, the lubrication layer was coated in a puling-up method, and after the coating, heating treatment was carried out on the lubrication layer at 110° C. for one hour in the atmosphere with the use of an oven.

FIG. 13 shows magnetic characteristics of the magnetic disks 1 and 2. As shown, because of a difference in the Pt amount, the magnetic disk 2 has larger coercive force and saturation magnetic flux density than those of the magnetic disk 1 at 25° C. Further, respective magnetocrystalline anisotropy constants at 0 K of the magnetic disks 1 and 2 obtained from the temperature characteristics of the saturation magnetic flux density and the coercive force in a range between 10 K and 300 K measured by the SQID apparatus are such that the value is larger in the magnetic disk 2 than that in the magnetic disk 1 by approximately 20%.

On the other hand, a so-called dynamic coercive force Hc', which is a coercive force of the magnetic dick when a recording magnetic field is switched at a high speed is expressed by the following expression (1) according to Bertram (H. N. Bertram, H. J. Richter, Arrhenius-Neel: J. Appl. Phys. vol. 83, No. 8, pp. 4991 (1999)):

$$Hc'=0.474Hk\{1-1.55\,[(k_B T/KuV)\times\ln(fot/\ln 2)/2]\}^{2/3} \quad (1)$$

There, Hk denotes an anisotropic magnetic field, $k_B$ denotes the Botzmann constant, T denotes a temperature, Ku denotes a magnetocrystalline anisotropy constant, V denotes a volume of bits of exchange coupling made between the first and second magnetic layers 26 and 29, 'fo' denotes an attempt frequency, and 't' denotes a magnetic field switching interval. According to the expression (1), the dynamic coercive force Hc'=0.474 Hk, at T=0 K, and, since the dynamic coercive force does not depend on the magnetic field switching interval t, it becomes equal to the coercive force. The coercive force at 0 K obtained from the temperature characteristics in a range between 0 K and 300 K is, as shown in FIG. 13, approximately equal between the magnetic disk 1 and the magnetic disk 2. Therefrom, it can be seen that also the anisotropic magnetic field Hk is approximately equal between the magnetic disks 1 and 2.

Figure 14:
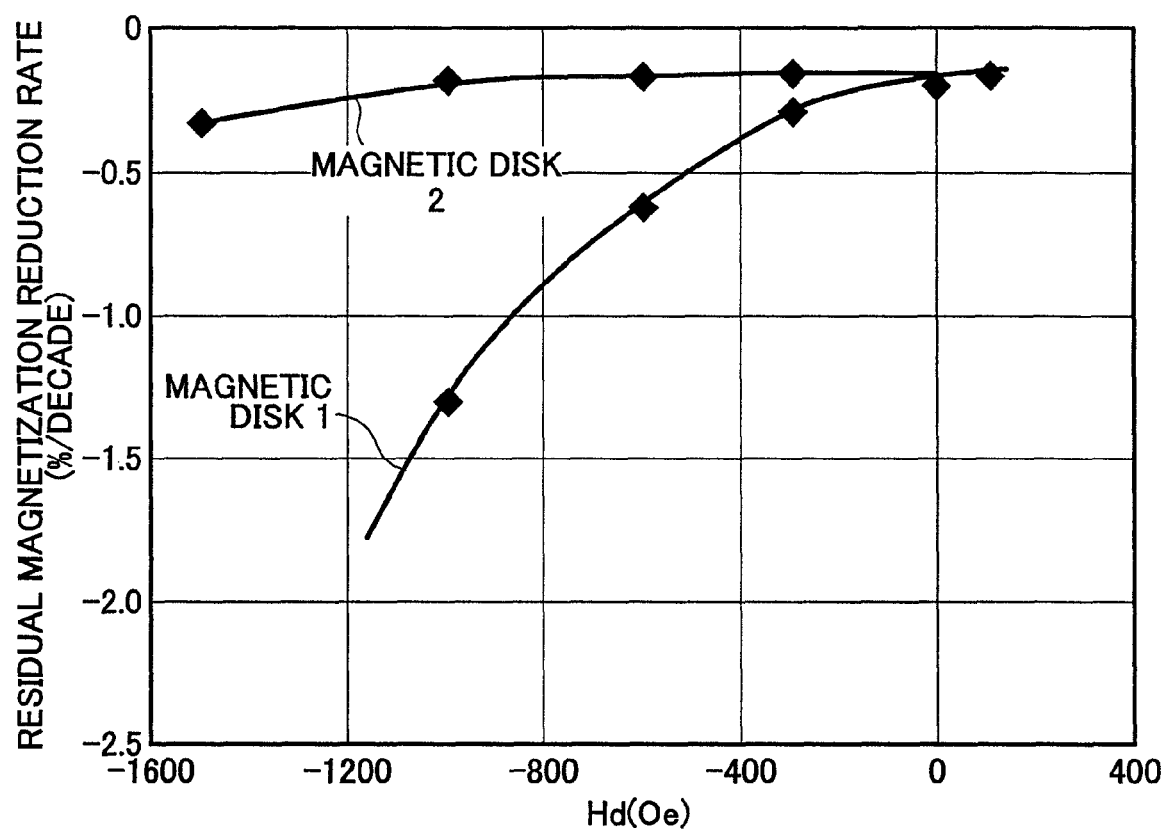
FIG. 14 shows thermal stability of the magnetic disk 1 and the magnetic disk 2.
Figure 17:
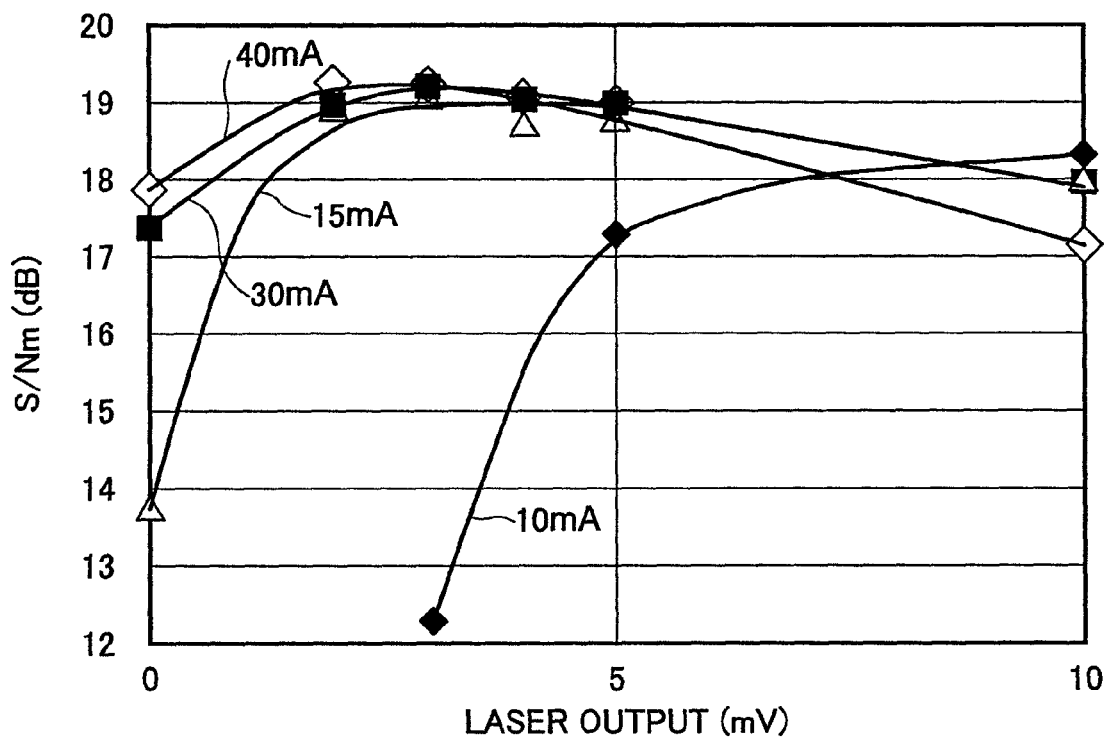
FIG. 17 shows a relationship between S/N ratio and laser output in the magnetic disk 1.

As can be seen from the above, in the magnetic disk 2, with respect to the magnetic disk 1, the magnetocrystalline anisotropy constant Ku and the saturation magnetic flux density were increased without much change in the anisotropic magnetic field Hk, and thus, improvement in the thermal stability was attempted. With reference to FIGS. 14 and 17, specific description therefor is made next.

FIG. 14 shows the thermal stabilities of the magnetic disks 1 and 2. The ordinate denotes a residual magnetization reduction rate, where the residual magnetization reduction rate becomes larger in the downward direction. A unit '%/decade' of the residual magnetization reduction rate is expressed by $(1-M2/M1) \times 100$, where M1 denotes reference residual magnetization at a time t from beginning of applying a demagnetizing magnetic field, and M2 denotes residual magnetization at a time 10t (=ten times the time t). The abscissa denotes the demagnetizing magnetic field Hd. Measurement of the thermal stability was carried out as follows: Chips (each having a size of approximately 7 mm×7 mm) were cut out from the magnetic disks 1 and 2, respectively, then they were magnetized in one direction, and, after that, while a demagnetization magnetic field Hd selected from a range between 0 and −1500 Oe (118.5 kA/m) was applied in the opposite direction, the residual magnetization reduction rate at 27° C. (300 K) was measured by the SQID apparatus. The more the residual magnetization reduction rate approximates 0, i.e., it goes in the upward direction in the figure (graph), the more the thermal stability is improved.

As shown in FIG. 14, for example, when the demagnetizing magnetic field Hd is −800 Oe, the residual magnetization reduction rate is reduced to be approximately ⅙ in the magnetic disk 2 with respect to the magnetic disk 1. In other words, it can be seen that, by employing material having a large magnetocrystalline anisotropy constant as material of the second magnetic layer, it is possible to improve the thermal stability.

Figure 15A:
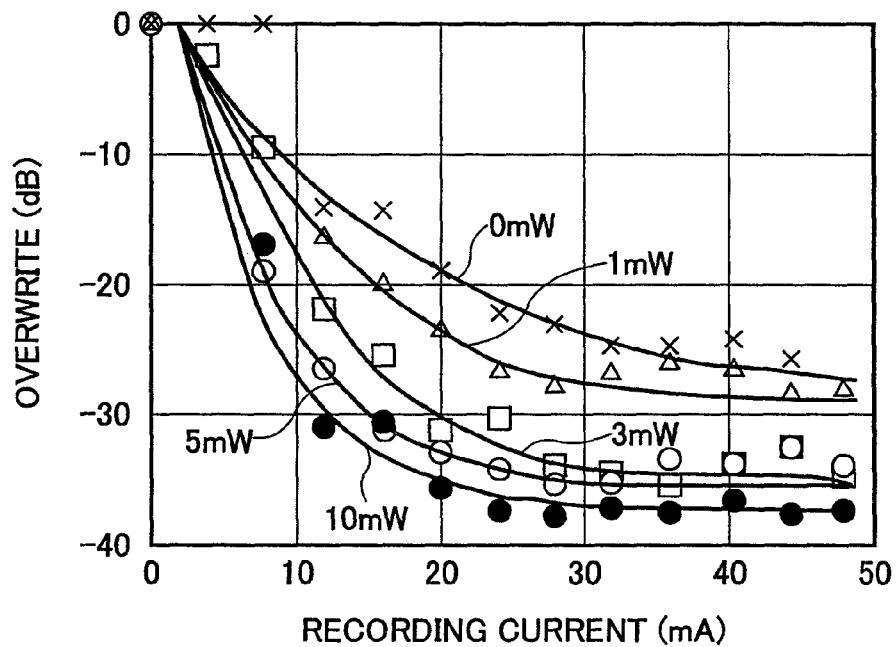
FIGS. 15A and 15B show relationship between overwrite performance and laser output in the first and second magnetic disks, respectively.
Figure 15B:
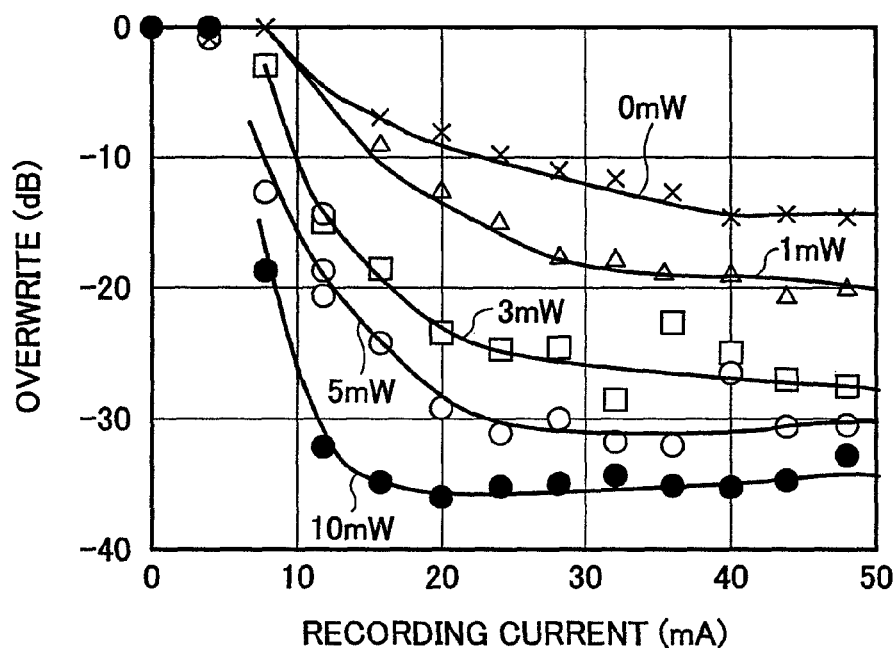

FIGS. 15A and 15B show relationships between the overwrite performance and the laser output. FIG. 15A shows the overwrite performance of the magnetic disk 1 while FIG. 15B shows the overwrite performance of the magnetic disk 2. In the figures, numeric values denote the amounts of the laser output.

As shown in FIGS. 15A and 15B, in a case where no laser beam is applied at recording (in the figures, expressed by 0 mA), even when the recording current is 48 mA, for each of the magnetic disks 1 and 2, the overwrite performance does not reach a satisfactory value of −30 dB. On the other hand, when a laser beam is applied, the overwrite performance is improved as the laser output is increased, and, the overwrite performance is improved from −30 dB at a time of 3 mW in the case of the magnetic disk 1, and at a time of 5 mW in the case of the magnetic disk 2. Accordingly, it can be seen that, even for the magnetic disks 1 and 2, for which recording cannot be carried out when no laser beam is applied, i.e., according to the conventional method, and thus, the overwrite performance is not satisfactory in this state, the overwrite performance can be remarkably improved therefrom as a result of a laser beam being applied.

Measurement of the overwrite performance was carried out with the use of a spin stand for evaluating a magnetic disk (provided by Kyodo Electronic System, Co. Ltd., a product name of LS90), in a condition where the saturation magnetic flux density of the magnetic pole in the recording device was set as 2.4 T, the core width thereof was 0.3 µm, the core width of the GMR reproduction device was 0.19 µm, the laser beam wavelength was 685 nm, the spot size was 1.1 µm, the recording position radius=25.5 mm, the rotation speed was 2000 RPM, the long wavelength was 87 kfci, and the short wavelength was 700 kfci, and, the laser output was changed from 0 mW through 10 mW. The laser beam was applied from the glass substrate surface side on which no films are formed, and was focused on the second magnetic layer or such formed thereon. The other characteristics described later were also measured by the same conditions unless otherwise stated.

Figure 16:
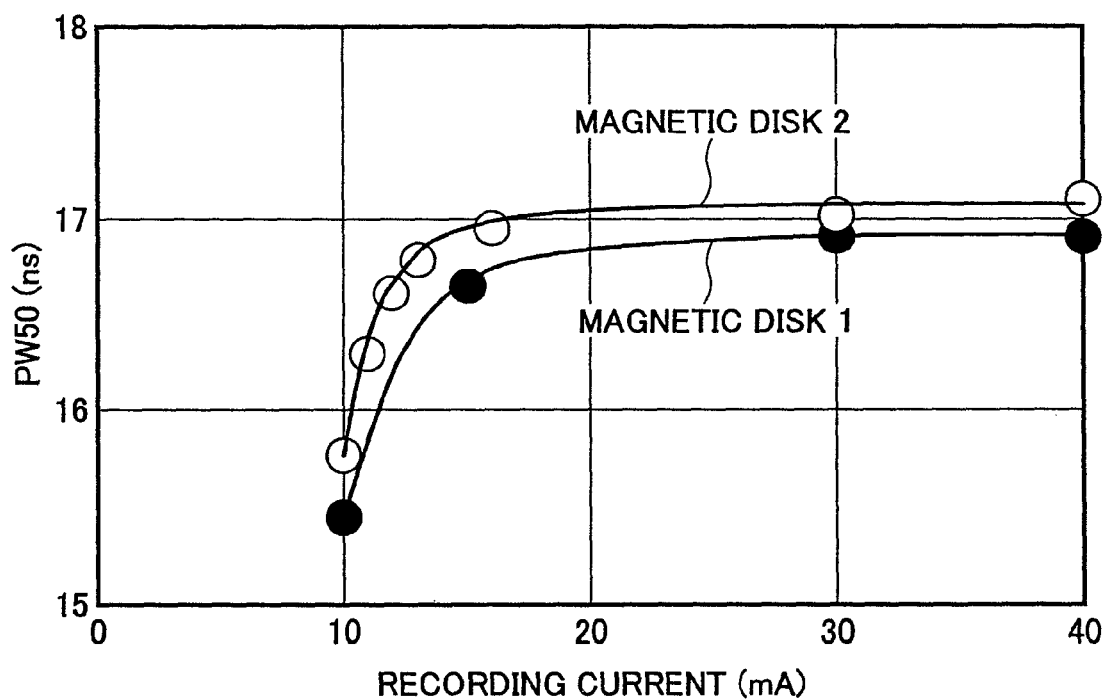
FIG. 16 shows solitary wave half-value width characteristics of the magnetic disk 1 and the magnetic disk 2.

FIG. 16 shows solitary wave half-value width (PW50) characteristics of the magnetic disks 1 and 2. The laser power was set as 3 mW for the magnetic disk 1 while the same was 5 mW for the magnetic disk 2. Further, the requirement applied was such that the overwrite performance shown in FIGS. 15A and 15B should be ensured as −30 dB.

As shown in FIG. 16, the solitary wave half-value width PW50 is approximately saturated for each of the magnetic disks 1 and 2 with the magnetic recording current of approximately 16 mA, and PW50 has a constant value at least in a range between 20 mA and 40 mA in the recording current. Further, not shown, it was proved that the output is saturated with the recording current of more than 16 mA. Conventionally, the recording current is set as 40 mA. In contrast thereto, it can be seen that, the solitary wave half-value width PW50 is saturated with a lower recording current according to the present invention, i.e., resolution is satisfactory with the lower recording current, and therefrom, it can be seen that a range of the recording current from which selection should be made can be effectively widened according to the present invention. Furthermore, by reducing the recording current, the recording magnetic field distribution from the recording device becomes satisfactory, and, thus, it is possible to remarkably reduce generation of side erase or magnetic transition zone width increase occurring due to the recording magnetic field spreading in the in-plane direction of the recording medium from the recording device with the recording current on the order of 40 mA in the prior art. The measurement was carried out in a condition in which the recording density of the solitary wave half-value width PW50 was set at 24 kfci.

FIG. 17 shows a relationship between the S/N ratio and the laser output in the magnetic disk 1. The S/N ratio is expressed by a ratio between an average signal output S (at the recording density of 350 kfci) and a medium noise Nm. Numeric values in the figure denote recording currents. In the figure, shown is a result for the magnetic disk 1 having the film thickness in the second magnetic layer of 19 nm.

As shown, when the recording current was 15 mA, 30 mA or 40 mA, other than 10 mA, the S/N ratio was maximum with the laser output in a range between 2 and 4 mA. In other words, it can be seen that the S/N ratio is not much influenced even from somewhat change in the laser output. Furthermore, it is easily expected that, even from a relatively slight laser output, the maximum S/N value can be achieved, and thermal influence such as degaussing on the magnetic disk can thus be reduced. Although not shown for the magnetic disk 2, a range of the laser output in which the S/N ratio became maximum was approximately identical also for the magnetic disk 2.

Figure 18:
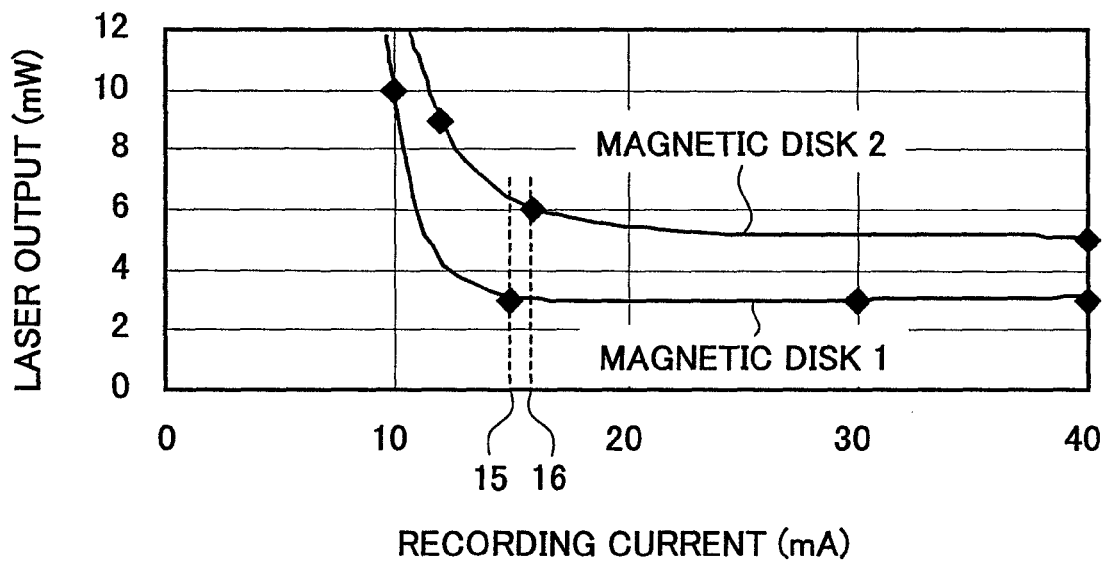
FIG. 18 shows a relationship between laser output and recording current in which an S/N ratio becomes maximum.

FIG. 18 shows a relationship between the laser output and the recording current with which the S/N ratio of the magnetic disks 1 and 2 becomes maximum. FIG. 18 shows the relationship between the laser output and the recording current, with which the S/N ratio of the magnetic disk 1 becomes maximum shown in FIG. 17, and also, shows the same for the magnetic disk 2.

As shown in FIG. 18, 10 mW in the laser output is required to maximize the S/N ratio with the recording current in the recording device of 10 mA for the magnetic disk 1, while with the recording current of 15 mA, the laser output required is reduced to 3 mW, and also, the laser output required to maximize the S/N ratio is approximately fixed at 3 mW even when the recording current is further increased. For the magnetic disk 2, the recording current from which the laser output required to maximize the S/N ratio becomes approximately fixed is 16 mA. That is, in the magnetic storage in the prior art in which no laser beam is applied, normally, the recording current is set on the order of 50 mA for the purpose of ensuring the predetermined overwrite performance or such. In contrast thereto, in the embodiment according to the present invention, it can be seen that even 16 mA which is less than half of the above-mentioned 50 mA in the recording current can maximize the S/N ratio. The recording current from which the laser output maximizing the S/N ratio becomes approximately fixed corresponds to, as described below, the recording current (referred to as a 'magnetic field saturation recording current' hereinafter) at which the inclination of the generated magnetic field of the recording device with respect to the recording current remarkably decreases.

Figure 19:
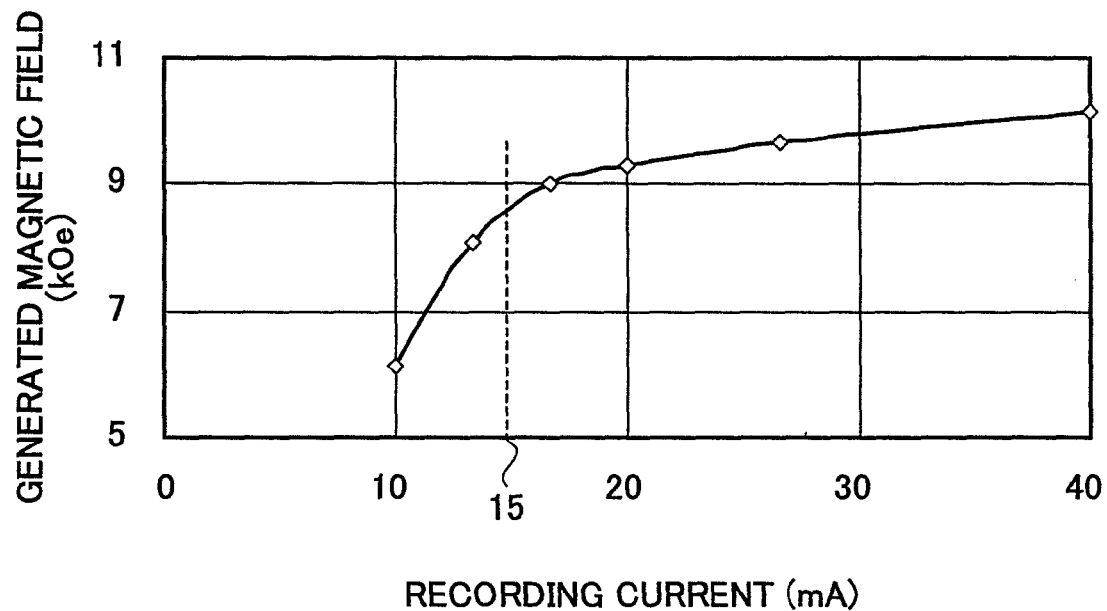
FIG. 19 shows a relationship between a generated magnetic field and a recording current in a recording device of the magnetic storage.

FIG. 19 shows a relationship between the generated magnetic field in the recording device and the recording current. The relationship in FIG. 19 is a relationship between the generated magnetic field (maximum value) and the recording current around a recording gap in the recording device obtained by calculation.

As shown in FIG. 19, it can be seen that the generated magnetic field in the recording device sharply increases in response to increase in the recording current from 10 mA, a degree of the increase, i.e., an inclination of the generated magnetic field then starts decreases around 15 mA of the recording current (magnetic field saturation recording current), and, then, the increase in the generated magnetic field is small even when the recording current is further increased.

As mentioned above, in the conventional magnetic storage in which no laser beam is applied, normally, the recording current is set on the order of 50 mA for the purpose of ensuring the overwrite performance or such. In this case, after the magnetic field saturation recording current is exceeded, the spatial distribution of the generated magnetic field spreads so that a concentration degree of the generated magnetic field deteriorates. As a result, at an extending end of the recording device, a magnetic field leaks also from a portion other than a surface facing the magnetic disk, and, as a result, a problem may occur in which information recorded in an adjacent track is erased, i.e., a side erase problem may occur. Also, another problem of head crash may occur due to the core (magnetic pole) of the recording device projecting due to being heated by the recording current, or such. In order to solve these problems, it is preferable that the recording current should be low while it should be more than 15 mA. Accordingly, it is preferable to set the recording current in a range between 15 mA and 40 mA, and, it is further preferable to set the same in a range between 15 mA and 30 mA.

The relationship shown in FIG. 19 was obtained by calculation as mentioned above, and, as described below, an output saturation current Isat usable instead of the magnetic field saturation recording current can be easily obtained from measurement.

Figure 20:
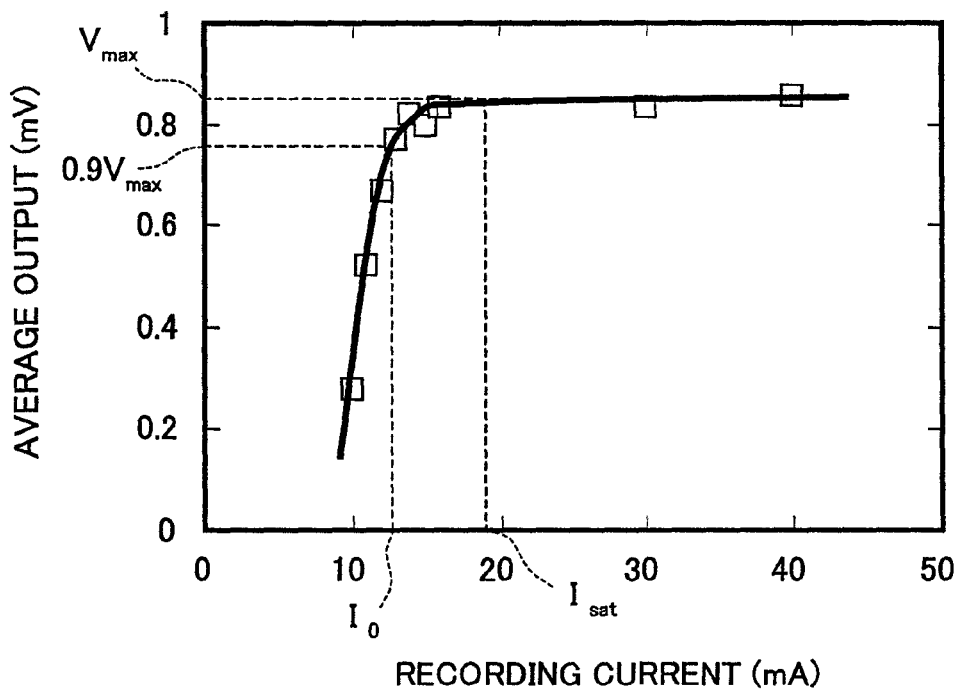
FIG. 20 shows an average output and a recording current in a low recording density in the magnetic disk 1.

FIG. 20 shows a relationship between an average output in a low recording density and a recording current in the magnetic disk 1. In this case, the measurement was carried out, in a condition in which, of the above-mentioned measurement condition for the present example, the recording density was set at 24 kfci, and the laser output was set at 1 mW.

With reference to FIG. 20, how to obtain the output saturation current Isat is described next. First, the maximum value Vmax of an average output is obtained. After that, the recording current Io (12.4 mA) with which 90% of Vmax (0.9 Vmax in FIG. 20) is obtained, is obtained. Then, the recording current which is 150% thereof (=1.5×Io) is obtained as the output saturation current Isat. As shown in FIG. 20, the thus-obtained output saturation current Isat is 18.6 mA, and, it can be seen that the recording current thus obtained is that, with which the average output is saturated. In the above-described relationship between the magnetic field saturation recording current and the output saturation current Isat, since the magnetic field saturation recording current is 15 mA as mentioned above, it can be approximately said that, the magnetic field saturation recording current=output saturation current Isat× 80%. In fact, 18.6×0.8≈15. Accordingly, in terms of the above-mentioned problems of the spatial distribution of the generated magnetic field, the side erase, and the projection of the magnetic pole, it is preferable to set the recording current in a range between 80% and 215% of the output saturation current Isat, and, it is further preferable to set the same in a range between 80% and 160%.

Next, influence of laser beam application at a time of recording on information already recorded, i.e., influence on the residual magnetization is described.

Figure 21:
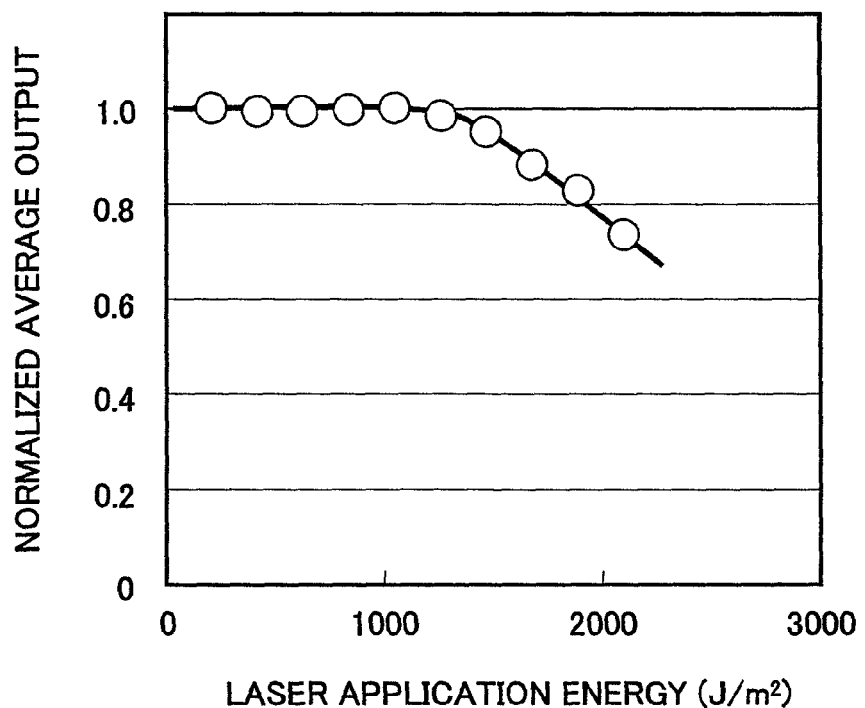
FIG. 21 shows change in normalized average output at a time of laser beam application in the magnetic disk 1.

FIG. 21 shows a change in a normalized average output at a time of laser beam application to the magnetic disk 1. In the figure, the ordinate denotes a normalized average output obtained from normalizing an average output with an initial average output measured after recording at a recording density of 350 kfci. The abscissa denotes laser application energy applied when the laser output is changed while the laser beam spot is approximately fixed. Measurement was carried out as follows: (1) Recording was carried out at a line density of 350 kfci; (2) An average output (i.e., the initial average output) was measured; (3) Laser beam application with predetermined laser beam application energy was carried out for one round of a track; (4) An average output (i.e., the average output after the beam application) was measured; and (5) The normalized average output=(the average output after the beam application)/(initial average output) was calculated. Then, the above-mentioned processes (1) through (5) were carried out for different laser beam application energy.

As shown in FIG. 21, no reduction occurs in the normalized average output of the magnetic disk 1 from the initial average output in a range of the laser beam application energy between 210 J/m$^3$ and 1050 J/m$^2$. With the laser beam application energy of 1260 J/m$^2$, reduction of approximately 5% occurs. Accordingly, in consideration of a possibility that a laser beam is applied to an area other than an area to currently record on the magnetic recording medium, i.e., a possibility that a laser beam is applied to an area for which already written information should be saved, it can be seen that the laser beam application energy at a time of recording should be preferably set less than 1050 J/m$^2$ within which the normalized average output does not decrease. For the magnetic disk 1, as shown in FIG. 15A, it is preferable that the laser beam at a time of recording has the laser beam application energy more than 360 J/m$^2$ corresponding to the laser output of 3 mW to ensure the overwrite performance of −30 dB. Accordingly, it can be seen that the laser beam application energy at a time of recording should be preferably set in a range between 360 J/m$^3$ and 1050 J/m$^2$. However, this range of the laser beam application energy may be changed depending on the magnetic characteristics of a particular magnetic disk. For example, for the magnetic disk 2, the magnetocrystalline anisotropy constant Ku is larger than that of the magnetic disk 1, and thereby, the upper limit the preferable range of the laser beam application energy is expected to be increased.

Thus, according to the specific example of the fourth embodiment of the present invention, by heating the surface of the magnetic disk at a time of recording, it is possible to achieve satisfactory overwrite performance and resolution and to achieve the high S/N ratio, with the use of the magnetic disk having the large magnetocrystalline anisotropy constant and having the satisfactory thermal stability, without increasing the recording magnetic field. Since it is possible to reduce the recording current from that in the case of the conventional method, it is possible to carry out recording in a satisfactory condition of the recording magnetic field distribution, so as to further improve the resolution, and also to solve the various problems such as that of the side erase or such.

Further, the present invention is not limited to the above-described embodiments and specific examples, and variations and modifications may be made without departing from the basic concept of the present invention claimed below.

For example, in the magnetic storage according to the fourth embodiment, as the magnetic recording medium, it is not necessary to limit it to the magnetic disk, but, a magnetic tape in a helical scanning type or a serpentine type, or, a form of a card may also be applied.

The present application is based on Japanese priority application No. 2004-061225 and 2004-000632, filed on Mar. 4, 2004 and Jan. 5, 2004, respectively, the entire contents of which are hereby incorporated by reference.

What is claimed is:

1. A magnetic storage comprising:
a magnetic recording medium having a recording layer containing crystalline magnetic grains;
a heating unit heating selectively said magnetic recording medium; and
a recording unit having a magnetic recording head, wherein:
said heating unit heats said magnetic recording medium while said magnetic head records information to said magnetic layer,
said heating unit comprises a laser irradiation optical system applying a laser beam on a surface of said magnetic recording medium, and
output of the laser beam is controlled according to a recording frequency at which said recording head records.

2. The magnetic storage as claimed in claim 1, wherein:
said recording layer comprises a polycrystal comprising crystal grains, a columnar granular structure having a crystalline grain in a columnar structure and nonmagnetic material surrounding it, or a structure in which nanoparticles are disposed.

3. The magnetic storage as claimed in claim 1, wherein:
a spot diameter on said surface of the magnetic recording medium produced by the laser beam lies in a range between 0.1 and 20 times of a track width.

4. The magnetic storage as claimed in claim 1, wherein:
a spot diameter on said surface of the magnetic recording medium produced by the laser beam is larger than a core width of said recording head.

5. The magnetic storage as claimed in claim 3 claim 1, wherein:
the laser beam is set in a range of a laser application energy amount per unit area such that, within said range, once the laser beam is applied to an area in which information is recorded, and an average output of said area before and after the beam application may be approximately constant.

6. The magnetic storage as claimed in claim 1, wherein:
a recording current in said magnetic recording head is set in a range between 80% and 215% of an output saturation recording current value at which a magnetic field generated is approximately saturated with respect to the recording current.

7. The magnetic storage as claimed in claim 1, wherein:
KuV/kT of said magnetic recording medium at the heating temperature is set in a range between 15 and 80 in a case where said recording layer comprises a continuous film.

8. The magnetic storage as claimed in claim 1, wherein:
said magnetic layer comprises:
a first magnetic layer; and
a second magnetic layer formed on said first magnetic layer, wherein:
said first magnetic layer and said second magnetic layer make exchange coupling with one another, and also, magnetization of said first magnetic layer and magnetization of said second magnetic layer are in anti-parallel to one another in a condition in which no external magnetic field is applied.

9. The magnetic storage as claimed in claim 8, wherein:
a non-magnetic coupling layer is provided between said first magnetic layer and said second magnetic layer.

10. The magnetic storage as claimed in claim 8, wherein:
said first magnetic layer and said second magnetic layer comprise in-plane orientation films or vertically magnetized films.

11. The magnetic storage as claimed in claim 8, wherein:
said first magnetic layer and said second magnetic layer form a patterned medium.

12. The magnetic storage as claimed in claim 8, wherein:
said first magnetic layer and/or said second magnetic layer comprises material selected from among a group of CoPt, CoCrPt, CoPt-M and a Co alloy containing CoCrPt-M, where M denotes B, Mo, Nb, Ta, W, Cu or an alloy thereof, where a Pt amount is set in a range between 12 atomic % and 35 atomic %.

13. The magnetic storage as claimed in claim 8, wherein:
said second magnetic layer has a larger anisotropic magnetic field than that of said first magnetic layer.

14. A magnetic storage comprising:
a magnetic recording medium comprising a first magnetic layer and a second magnetic layer formed on said first magnetic layer, wherein said first magnetic layer and said second magnetic layer make exchange coupling with one another, and also, magnetization of said first magnetic layer and magnetization of said second magnetic layer are in anti-parallel to one another in a condition in which no external magnetic field is applied;
a heating unit heating selectively said magnetic recording medium; and
a magnetic recording/reproducing unit comprising a magnetic recording head and a magnetic reproducing device, wherein:
said heating unit heats said magnetic recording medium while said magnetic recording head records information on said magnetic recording medium,
said heating unit comprises a laser irradiation optical system applying a laser beam on a surface of said magnetic recording medium, and
output of the laser beam is controlled according to a recording frequency at which said recording head records.

15. A magnetic storage comprising:

a magnetic recording medium comprising a first magnetic layer and a second magnetic layer formed on said first magnetic layer, wherein said first magnetic layer and said second magnetic layer make exchange coupling with one another, and also, magnetization of said first magnetic layer and magnetization of said second magnetic layer are in anti-parallel to one another in a condition in which no external magnetic field is applied;

a heating unit heating selectively said magnetic recording medium; and a recording/reproducing unit comprising at least a magnetic recording head, wherein:

said heating unit heats said magnetic recording medium so as to increase reproduction output and said recording/reproducing unit reproduces recorded information from said magnetic recording medium, said heating unit comprises a laser irradiation optical system applying a laser beam on a surface of said magnetic recording medium, and output of the laser beam is controlled according to a recording frequency at which said recording head records.

16. The magnetic storage as claimed in claim 15, wherein:
said magnetic recording medium having a recording layer containing crystalline magnetic grains.

17. The magnetic storage as claimed in claim 15, wherein:
said magnetic recording medium comprises:
first through n-th magnetic layers, wherein:
at least two of said n magnetic layers make exchange coupling therebetween antiferromagnetically; and
net residual area magnetization of said first through n-th magnetic layers at a first temperature is larger than the net residual magnetization at a second temperature lower than said first temperature,
where n denotes an integer equal to or larger than three.

18. A method for reproducing information recorded by a recording/reproducing unit having a magnetic recording head on a magnetic recording medium comprising two magnetic layers making exchange coupling with one another, comprising the steps of heating said magnetic recording medium, and causing a residual magnetization of one of these magnetic layers to increase at a rate higher than that at which residual magnetization of the other magnetic layer is thereby caused to increase; and reproducing the information recorded on said magnetic recording medium, wherein said heating step includes a heating unit comprising a laser irradiation optical system applying a laser beam on a surface of said magnetic recording medium, and wherein output of the laser beam is controlled according to a recording frequency at which said recording head records.

19. The method as claimed in claim 18, wherein:
said two magnetic layers make exchange coupling with one another antiferromagnetically.

* * * * *